US012114265B2

(12) United States Patent
Kuang et al.

(10) Patent No.: US 12,114,265 B2
(45) Date of Patent: Oct. 8, 2024

(54) INFORMATION TRANSMISSION METHOD AND APPARATUS

(71) Applicant: Huawei Technologies Co., Ltd., Shenzhen (CN)

(72) Inventors: Yiru Kuang, Beijing (CN); Jian Wang, Beijing (CN); Chuting Yao, Beijing (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/605,863

(22) PCT Filed: Apr. 17, 2020

(86) PCT No.: PCT/CN2020/085227
§ 371 (c)(1),
(2) Date: Oct. 22, 2021

(87) PCT Pub. No.: WO2020/216132
PCT Pub. Date: Oct. 29, 2020

(65) Prior Publication Data
US 2022/0174599 A1    Jun. 2, 2022

(30) Foreign Application Priority Data

Apr. 23, 2019    (CN) .......................... 201910330949.0

(51) Int. Cl.
*H04W 52/02*    (2009.01)
*H04W 76/15*    (2018.01)
(Continued)

(52) U.S. Cl.
CPC ....... *H04W 52/0232* (2013.01); *H04W 76/15* (2018.02); *H04W 76/20* (2018.02); *H04W 76/30* (2018.02)

(58) Field of Classification Search
CPC . H04W 36/0069; H04W 88/06; H04W 76/15; H04W 72/04; H04W 72/1215;
(Continued)

(56) References Cited

U.S. PATENT DOCUMENTS 10,785,817 B2 *   9/2020  Palat ..................... H04W 76/15
2015/0373523 A1 * 12/2015  Jeong .................. H04L 41/5029
                                              455/406

(Continued)

FOREIGN PATENT DOCUMENTS

CN        105101472 A     11/2015
CN        109246824 A      1/2019
(Continued)

OTHER PUBLICATIONS

Qualcomm Inc., "Extending LTE Overheating mechanism to NR", 3GPP TSG-RAN WG2 #101, R2-1803617, Athens, Greece, Feb. 26-Mar. 2, 2018, 4 pages.
(Continued)

*Primary Examiner* — Mahran Y Abu Roumi
(74) *Attorney, Agent, or Firm* — Slater Matsil, LLP

(57) ABSTRACT

A method includes: determining, by a terminal device, first assistance information, wherein the first assistance information is used to indicate a configuration parameter requested by the terminal device from a first network device; and sending, by the terminal device, the first assistance information to a second network device, wherein the second network device is used to send the first assistance information to the first network device.

14 Claims, 7 Drawing Sheets

Core network device 110

Radio access network device 120

Terminal device 130

Terminal device 140

(51) Int. Cl.
*H04W 76/20* (2018.01)
*H04W 76/30* (2018.01)

(58) Field of Classification Search
CPC ..... H04W 24/10; H04W 48/20; H04W 76/19; H04L 5/00; H04L 5/0053; H04B 15/00
See application file for complete search history.

(56) References Cited

U.S. PATENT DOCUMENTS

| | | | |
|---|---|---|---|
| 2017/0196008 A1* | 7/2017 | Wang | H04W 72/0446 |
| 2017/0230917 A1* | 8/2017 | Ouchi | H04L 5/0055 |
| 2019/0053292 A1* | 2/2019 | Ali | H04W 88/06 |
| 2020/0008113 A1* | 1/2020 | Chen | H04W 36/0038 |
| 2021/0067299 A1* | 3/2021 | Wu | H04W 72/1215 |
| 2022/0014953 A1* | 1/2022 | Teyeb | H04W 24/10 |
| 2022/0132615 A1* | 4/2022 | Sharma | H04W 48/20 |

FOREIGN PATENT DOCUMENTS

| | | |
|---|---|---|
| CN | 109246833 A | 1/2019 |
| CN | 113826431 A | 12/2021 |
| EP | 3897058 A1 | 10/2021 |
| WO | 2015199319 A1 | 12/2015 |
| WO | 2018056623 A1 | 3/2018 |
| WO | 2018130115 A1 | 7/2018 |
| WO | 2019059673 A1 | 3/2019 |

OTHER PUBLICATIONS

3GPP TS 38.331 V15.5.1 (Apr. 2019), 3rd Generation Partnership Project; Technical Specification Group Radio Access Network; NR; Radio Resource Control (RRC) protocol specification (Release 15), 491 pages.
Ericsson, "Extension of overheating indication parameters", 3GPP TSG-RAN WG2 #104, R2-1817930, Spokane, WA, US, Nov. 12-16, 2018, 2 pages.
Huawei et al., "Coordination for overheating in MR-DC scenario", 3GPP TSG-RAN2 Meeting#105bis, R2-1904936, (Revision of R2-1901681), Xi'an, China, Apr. 8-12, 2019, 3 pages.
Huawei et al., "UE reporting assistance information to gNB", 3GPP TSG RAN WG1 Ad-Hoc Meeting 1901, R1-1901243, Jan. 21-25, 2019, 5 Pages, Taipei.
Vivo., "UE assistant information", 3GPP TSG RAN WG1 #96bis, R1-1904120, Apr. 8-12, 2019, 3 Pages, Xi'an, China.
Huawei et al., "CR on UE overheating support for NGEN-DC", 3GPP TSG-RAN2 Meeting#105, R2-1901680, Feb. 25-Mar. 1, 2019, 5 Pages, Athens, Greece.
3GPP TS 37.340 V15.5.0 (Mar. 2019), 3rd Generation Partnership Project;Technical Specification Group Radio Access Network; Evolved Universal Terrestrial Radio Access (E-UTRA) and NR; Multi-connectivity; Stage 2 (Release 15), 68 pages.
Apple, "Enhancement on SCell Activation and Deactivation", 3GPP TSG-RAN WG2 Meeting #105bis, R2-1903609, Xi'an, China, Apr. 8-12, 2019, 4 pages.
Huawei et al., "UE reporting assistance information to gNB", 3GPP TSG RAN WG1 Ad-Hoc Meeting 1901, R1-1901243, Taipei, Jan. 21-25, 2019, 5 pages.
Huawei et al., "Discussion on TA group management", 3GPP TSG-RAN WG2 Meeting #74, R2-113285, Barcelona, Spain, May 9-13, 2011, 4 pages.
Huawei et al., "37.340 Draft CR for addressing overheating issue in EN-DC scenario—Option 2", 3GPP TSG-RAN2 Meeting #107bis, R2-1913693, Chongqing, China, Oct. 14-18, 2019, 7 pages.
Intel Corp., "Discussion on non-TM10 Homogenous Network CRS-IM RX", 3GPP TSG RAN4 Meeting #76, R4-154142, Beijing, China, Aug. 24-28, 2015, 6 pages.
Nokia et al., "Assistance information for NR overheating", 3GPP TSG-RAN WG2 Meeting #104, R2-1816537, Spokane, WA, US, Nov. 12-16, 2018, 3 pages.
Qualcomm Inc., "UE Assistance Information for power saving", 3GPP TSG-RAN WG2 Meeting #105bis, R2-1903053, Xi'an, China, Apr. 8-12, 2019, 3 pages.
Vivo, "Consideration on RAN1 recommendation for power saving study", 3GPP TSG RAN WG1 Meeting #96bis, R1-1904106, Xi'an, China, Apr. 8-12, 2019, 7 pages.
Vivo, "Discussion on the IDC report of NR frequency in EN-DC", 3GPP TSG-RAN WG2 Meeting #102, R2-1807634, revision of R2-1804601, Busan, Korea, May 21-25, 2018, 7 pages.

* cited by examiner

INFORMATION TRANSMISSION METHOD AND APPARATUS

CROSS-REFERENCE TO RELATED APPLICATIONS

This application is a national stage of International Application No. PCT/CN2020/085227, filed Apr. 17, 2020, which claims priority to Chinese Patent Application No. 201910330949.0, filed Apr. 23, 2019. Both of the aforementioned applications are hereby incorporated by reference in their entireties.

TECHNICAL FIELD

This application relates to the communications field, and more specifically, to an information transmission method and apparatus in the communications field.

BACKGROUND

During high-speed data transmission, because a terminal device is provided with a large quantity of multiple-input multiple-output radio antenna layers (multiple-input multiple-output layer, MIMO layer), a high bandwidth, and a plurality of carriers, an overheating problem occurs on the terminal device, or power consumption of the terminal device is excessively high.

To resolve the overheating problem of the terminal device or reduce the power consumption of the terminal device, different types of information needs to be exchanged between the terminal device and a network device. For example, terminal device assistance information (UE assistance information) may be sent to a base station, so that the base station can adjust a communication parameter configured for the terminal device, for example, a maximum quantity of secondary cells, a maximum quantity of antenna layers MIMO layers, or a maximum aggregated bandwidth, to resolve the current overheating problem of the terminal device or reduce the power consumption of the terminal device.

However, for a multi-radio dual connectivity (multi-radio dual connectivity, MR-DC) network architecture, two access network devices (a master node and a secondary node) simultaneously provide service transmission for the terminal device. After the overheating problem occurs on the terminal device, in addition to that the master node needs to adjust the communication parameter configured for the terminal device, the secondary node also needs to adjust the communication parameter configured for the terminal device, to resolve the overheating problem of the terminal device or reduce the power consumption of the terminal device.

SUMMARY

This application provides an information transmission method and apparatus. According to the method, an appropriate maximum quantity of MIMO layers, a maximum quantity of SCells, or a maximum aggregated bandwidth can be configured for a terminal device, to resolve an overheating problem of the terminal device or reduce power consumption of the terminal device.

According to a first aspect, an information transmission method is provided. The method includes: A terminal device determines first assistance information, where the first assistance information is used to indicate a configuration parameter requested by the terminal device from a first network device; and the terminal device sends the first assistance information to a second network device.

Optionally, in this application, in an MR-DC network architecture, the first network device may be a secondary node device (secondary node), and the second network device is a master node device (master node).

According to the information transmission method provided in this embodiment of this application, the terminal device reports overheating assistance information to the secondary node, and the secondary node configures a new communication parameter for the terminal device based on the overheating assistance information, to effectively resolve an overheating problem of the terminal device. Alternatively, the terminal device reports power consumption assistance information to the secondary node, and the secondary node configures a new communication parameter for the terminal device based on the power consumption assistance information, to reduce power consumption of the terminal device.

Specifically, if an overheating problem occurs on the terminal device, the terminal device may report overheating assistance information to a network device; or when the terminal device needs to reduce power consumption, the terminal device may report power consumption assistance information to a network device. In this application, the terminal device assistance information reported by the terminal device in the foregoing two scenarios is referred to as assistance information.

In this embodiment of this application, assistance information reported by the terminal device to the secondary node is referred to as "first assistance information", and assistance information reported by the terminal device to the master node is referred to as "second assistance information". In other words, the first assistance information is used to indicate a configuration parameter requested by the terminal device from the secondary node, or is used to indicate that the terminal device requests the first network device to configure a communication parameter for the terminal device, or is used to indicate a configuration parameter expected by the terminal device and the terminal device requests the secondary node to perform configuration based on the configuration parameter expected by the terminal device. Likewise, the second assistance information may also have a similar understanding. The second assistance information is used to indicate that the terminal device requests the configuration parameter expected by the terminal device from the master node.

It should be understood that, in this application, the first assistance information includes information used to indicate the configuration parameter requested by the terminal device from the secondary node. In addition, the first assistance information may further include more other information, and perform other functions. Likewise, the second assistance information may also include more other information, and perform other functions. This is not limited in this application.

Optionally, in a process in which the terminal device sends the first assistance information to the master node, the first assistance information may be carried in an uplink information transfer MRDC (ULInformationTransfer-MRDC) message, and the uplink information transfer MRDC message may be considered as a container (container). As an NR uplink dedicated control channel message (ul-DCCH-MessageNR), the first assistance information may be transmitted in the uplink information transfer MRDC message. The uplink information transfer MRDC message may be further used to transmit a measurement report (measurement report) and NR failure information (failure information).

Optionally, no signaling radio bearer (signaling radio bearer, SRB3) is configured for the terminal device. In other words, some RRC messages between the terminal device and the secondary node cannot be directly sent between the terminal device and the secondary node through the SRB3. In this case, the terminal device may send the first assistance information to the secondary node through forwarding by the master node.

With reference to the first aspect, in some possible implementations, before the terminal device determines the first assistance information, the method further includes: The terminal device sends first information to the second network device, where the first information is used to indicate whether the terminal device supports reporting of the first assistance information.

Specifically, before the terminal device reports the assistance information, the terminal device can report the assistance information only when two conditions are met. The first condition is that the terminal device has a capability of reporting the assistance information to the network device, and the capability of reporting the assistance information may be an optional function of the terminal device. During actual implementation of the terminal device, some terminal devices select to develop this function. In this case, the terminal device has the capability of reporting the assistance information. Otherwise, the terminal device does not have the capability of reporting the assistance information. In this application, it is considered by default that the terminal device has the capability of reporting the assistance information. The second condition is that the network device allows the terminal device to report the assistance information. Therefore, before reporting the assistance information, the terminal device may report, to the network device, the first information used to indicate whether the terminal device supports reporting of the assistance information.

It should be understood that the first information may be capability information reported by the terminal device. In a process in which the terminal device sends the first information to the master node, the first information may be carried in a terminal device capability information (UE capability information) message, and the terminal device capability information message indicates a radio access capability of the terminal device.

It should be further understood that the first information herein may be used to indicate a capability of the terminal device to report the assistance information to the master node, and may be further used to indicate a capability of the terminal device to report the assistance information to the secondary node. The terminal device does not need to separately report the capability information to the master node and the secondary node. In other words, the terminal device sends the first information to the master node, and the master node may further send the first information to the secondary node. Therefore, both the master node and the secondary node may determine, based on the first information, whether the terminal device has the capability of reporting the assistance information.

Optionally, the first information herein may be used to indicate the capability of the terminal device to report the first assistance information to the secondary node, and the secondary node may determine, based on the first information, whether the terminal device has the capability of reporting the first assistance information. The master node side may have separate capability information to indicate a capability of the terminal device to report the related assistance information to the master node. This is not limited in this application.

Optionally, the first information may be carried in an NR capability (UE-NR-capability) in the terminal device capability information message, in other words, carried in an NR capability container (container). Specifically, an indication message indicating whether the terminal device supports reporting of the assistance information is included in the NR capability container container of the base station. The terminal device sends the NR capability container container message to the master node, and then the master node forwards the NR capability container message to the secondary node, so that both the master node and the secondary node can obtain the first information to determine whether the terminal device supports reporting of the assistance information.

With reference to the first aspect and the foregoing implementations, in some possible implementations, when the first information is used to indicate that the terminal device supports reporting of the first assistance information, the method further includes: The terminal device receives second information sent by the second network device, or the terminal device receives the second information sent by the first network device, where the second information is used to indicate that the terminal device can report the first assistance information.

Specifically, the second information may be configuration information of the secondary node, and the second information is used to indicate that the terminal device is allowed to report the first assistance information, or the second information is used to indicate that the terminal device can report the first assistance information. The secondary node may determine, based on the capability information (the first information) reported by the terminal device, that the terminal device supports reporting of the first assistance information, and send the second information to the terminal device to indicate that the terminal device is allowed to report the assistance information.

It should be understood that the second information is a configuration on a secondary node side for only configuring sending of the first assistance information on the secondary node side. There may be a separate configuration such as similar configuration information on a master node side for configuring sending of the related assistance information (the second assistance information) on the master node side. When the master node sends the configuration information on the master node side to the terminal device, it indicates that the terminal device is allowed to report the related assistance information (the second assistance information) on the master node side. This is not limited in this application.

With reference to the first aspect and the foregoing implementations, in some possible implementations, the second information is further used to indicate to configure a value of a timer for the terminal device.

Specifically, the timer may be a prohibit timer. The terminal device determines a running period and a non-running period of the prohibit timer based on the value of the timer in the second information. Therefore, the terminal device may send the first assistance information within the non-running period of the prohibit timer, and may not send the first assistance information within the running period of the prohibit timer. This is not limited in this application.

It should be understood that the timer is a timer used on the secondary node side for only controlling sending of the first assistance information on the secondary node side.

There may be an independently used timer such as a similar prohibit timer on the master node side for controlling sending of the related assistance information (the second assistance information) on the master node side. This is not limited in this application.

In a process of sending the second information, the master node may send the second information to the terminal device through an RRC connection reconfiguration message.

For example, when the signaling radio bearer (signaling radio bearer, SRB3) is configured for the terminal device. In other words, some RRC messages between the terminal device and the secondary node may be directly sent between the terminal device and the secondary node through the SRB3. In this case, the secondary node may directly send the second information to the terminal device through the SRB3.

Alternatively, when the SRB3 is not configured for the terminal device, the secondary node may send the second information to the terminal device through forwarding by the master node, as shown in step 403 and step 404 in FIG. 4. It should be understood that a type of a message between the master node and the secondary node is not limited in this application.

After receiving the second information, the terminal device determines that the assistance information can be reported. For example, when the overheating problem occurs on the terminal device and the overheating problem needs to be resolved, the terminal device may report the assistance information related to the overheating problem. Alternatively, when the power consumption is relatively high and the power consumption of the terminal device needs to be reduced, the terminal device may report the power consumption assistance information.

With reference to the first aspect and the foregoing implementations, in some possible implementations, the method further includes: The terminal device determines second assistance information, where the second assistance information is used to indicate a configuration parameter requested by the terminal device from the second network device; and the terminal device sends the second assistance information to the second network device.

With reference to the first aspect and the foregoing implementations, in some possible implementations, the method further includes: The terminal device sends third information to the second network device, where the third information is used to indicate whether the terminal device supports reporting of the first assistance information and/or the second assistance information.

It should be understood that, before reporting the first assistance information and/or the second assistance information, the terminal device may first report information used to indicate whether the terminal device supports reporting of the assistance information, and the information is referred to as "third information" herein. The third information may be understood as capability information reported by the terminal device. In a process in which the terminal device sends the third information to the master node, the third information may be carried in a terminal device capability information (UE capability information) message, and the terminal device capability information indicates a radio access capability of the terminal device.

In a possible implementation, the third information is used to indicate whether the terminal device supports reporting of the first assistance information and/or the second assistance information.

It should be understood that the third information herein may be used to indicate a capability of the terminal device to report the first assistance information and/or the second assistance information to the master node, and may be further used to indicate a capability of the terminal device to report the first assistance information and/or the second assistance information to the secondary node. The terminal device does not need to separately report the capability information to the master node and the secondary node. In other words, the terminal device sends the third information to the master node, and the master node may further send the third information to the secondary node. Therefore, both the master node and the secondary node may determine, based on the third information, whether the terminal device has the capability of reporting the first assistance information and/or the second assistance information.

It should be further understood that, that the terminal device has the capability of sending the second assistance information and the first assistance information does not mean that the terminal device needs to simultaneously send the second assistance information and the first assistance information each time. When the terminal device needs to send the assistance information, the terminal device may send either or both of the second assistance information and the first assistance information.

Optionally, the third information may be carried in an EUTRA capability (UE-EUTRA-capability) in the terminal device capability information message, in other words, carried in an EUTRA capability container (container). Specifically, an indication message indicating whether the terminal device supports reporting of the assistance information is included in the EUTRA capability container container. The terminal device sends the EUTRA capability container container to the master node, and the master node may obtain the third information to determine whether the terminal device supports reporting of the assistance information.

Specifically, the third information is used to indicate whether the terminal device supports reporting of the first assistance information and the second assistance information. In other words, whether the terminal device supports reporting of the first assistance information and the second assistance information is a capability of the terminal device: a capability that the terminal device supports reporting of both the first assistance information and the second assistance information, or a capability that the terminal device does not support reporting of the first assistance information and the second assistance information, namely, a capability that one piece of capability information controls both reporting of the second assistance information on the master node side and reporting of the first assistance information on the secondary node side.

With reference to the first aspect and the foregoing implementations, in some possible implementations, the first information and the third information may be a same type of information or different types of information.

Optionally, when the first information and the third information are different types of information, the first information and the third information may be carried on a same message carrier (for example, carried in the terminal device capability information message), or carried on different message carriers.

With reference to the first aspect and the foregoing implementations, in some possible implementations, when the third information is used to indicate that the terminal device supports reporting of the first assistance information and/or the second assistance information, the method further includes: The terminal device receives fourth information sent by the second network device, where the fourth information is used to indicate that the terminal device can report the first assistance information and/or the second assistance information.

Optionally, the fourth information is used to indicate that the terminal device can report the first assistance information and/or the second assistance information. The master node may determine, based on the capability information (the third information) reported by the terminal device, that the terminal device supports reporting of the first assistance information and/or the second assistance information, and send the fourth information to the terminal device to indicate that the terminal device is allowed to report the first assistance information and/or the second assistance information.

Specifically, when the fourth information is used to indicate that the terminal device can report the first assistance information and the second assistance information, it indicates that the terminal device can send the second assistance information on the master node side and the terminal device can send the first assistance information on the secondary node side, in other words, both reporting of the second assistance information on the master node side and reporting of the first assistance information on the secondary node side are configured by using the fourth information. It should be understood that, that the terminal device may send the second assistance information and the first assistance information does not mean that the terminal device needs to simultaneously send the second assistance information and the first assistance information each time. When the terminal device needs to send the assistance information, the terminal device may send either or both of the second assistance information and the first assistance information.

Optionally, the fourth information is further used to indicate to configure a value of a timer for the terminal device. Specifically, the timer may be a prohibit timer. The terminal device determines a running period and a non-running period of the prohibit timer based on the value of the timer in the fourth information. Therefore, the terminal device may send the first assistance information within the non-running period of the prohibit timer, and may not send the first assistance information within the running period of the prohibit timer. This is not limited in this application.

Specifically, when the fourth information is used to indicate that the terminal device can report the first assistance information and the second assistance information, the timer is a timer used on the master node side and the secondary node side for controlling sending of the second assistance information on the master node side and sending of the first assistance information on the secondary node side. In other words, both reporting of the second assistance information on the master node side and reporting of the first assistance information on the secondary node side are controlled by the timer.

Optionally, the fourth information and the second information may be a same type of information or different types of information.

Optionally, when the fourth information and the second information are different types of information, the fourth information and the second information may be carried on a same message carrier, or carried on different message carriers.

Optionally, the fourth information may be carried in an RRC connection reconfiguration message. With reference to the first aspect and the foregoing implementations, in some possible implementations, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

Specifically, the information transmission method provided in this application may be applied to a scenario in which an overheating problem occurs on the terminal device or a scenario in which the terminal device needs to reduce power consumption. In other words, the method may be used to resolve the overheating problem of the terminal device or reduce the power consumption of the terminal device.

With reference to the first aspect and the foregoing implementations, in some possible implementations, the first assistance information includes at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

In conclusion, according to the information transmission method provided in this embodiment of this application, the terminal device reports the first assistance information to the secondary node and/or reports the second assistance information to the master node. In a process in which the master node and the secondary node configure parameters for the terminal device, the master node and the secondary node may configure the parameters for the terminal device based on respective assistance information without coordination, or the master node coordinates configurations of the master node and the secondary node based on the assistance information reported by the terminal device, to configure the parameter for the terminal device. When the method is applied to a case in which the overheating problem occurs on the terminal device, the base station may configure a new communication parameter for the terminal device based on the overheating assistance information, to effectively resolve the overheating problem of the terminal device. Alternatively, when the method is applied to a case in which the power consumption of the terminal device is relatively high and the power consumption of the terminal device needs to be reduced, the power consumption assistance information is reported, and the base station may configure a new communication parameter for the terminal device based on the power consumption assistance information, to reduce the power consumption of the terminal device.

According to a second aspect, an information transmission method is provided. The method includes: A second network device receives first assistance information sent by a terminal device, where the first assistance information is used to indicate a configuration parameter requested by the terminal device from a first network device; and the second network device sends the first assistance information to the first network device.

With reference to the second aspect, in some possible implementations, before the second network device receives the first assistance information sent by the terminal device, the method further includes: The second network device receives first information sent by the terminal device, where the first information is used to indicate whether the terminal device supports reporting of the first assistance information.

With reference to the second aspect and the foregoing implementations, in some possible implementations, the method further includes: The second network device sends the first information to the first network device.

With reference to the second aspect and the foregoing implementations, in some possible implementations, when the first information is used to indicate that the terminal device supports reporting of the first assistance information, the method further includes: The second network device receives the second information sent by the first network device, where the second information is used to indicate that the terminal device can report the first assistance information; and the second network device sends the second information to the terminal device.

With reference to the second aspect and the foregoing implementations, in some possible implementations, the method further includes: The second network device receives second assistance information sent by the terminal device, where the second assistance information is used to indicate a configuration parameter requested by the terminal device from the second network device; and the second network device configures a parameter for the terminal device based on the second assistance information.

With reference to the second aspect and the foregoing implementations, in some possible implementations, the method further includes: The second network device receives third information sent by the terminal device, where the third information is used to indicate whether the terminal device supports reporting of the first assistance information and/or the second assistance information.

With reference to the second aspect and the foregoing implementations, in some possible implementations, when the third information is used to indicate that the terminal device supports reporting of the first assistance information and/or the second assistance information, the method further includes: The second network device receives fourth information sent by the terminal device, where the fourth information is used to indicate that the terminal device can report the second assistance information.

In a possible implementation, when the secondary node obtains a configuration parameter expected by the terminal device, the secondary node may configure a communication parameter for the terminal device, to resolve or alleviate an overheating problem of the terminal device or reduce power consumption of the terminal device. In other words, the first assistance information received by the secondary node from the terminal device includes only assistance information for adjusting a configuration of the secondary node. To be specific, after receiving the first assistance information, the secondary node may determine to adjust the configuration of the secondary node, and does not need to perform any configuration negotiation with the master node.

The terminal device may not only report the first assistance information to the secondary node, but also report the second assistance information to the master node. In this implementation, the master node may configure the parameter based on the second assistance information reported by the terminal device, and the secondary node may configure the parameter based on the first assistance information reported by the terminal device. In other words, the master node and the secondary node receive respective assistance information and coordinate respective configuration parameters.

For example, when the overheating problem occurs on the terminal device, the terminal device reports assistance information used to resolve the overheating problem of the terminal device. If the terminal device reports terminal device assistance information of the master node, the terminal device assistance information may include a configuration parameter of the master node that is expected by the terminal device. If the terminal device reports terminal device assistance information of the secondary node, the terminal device assistance information may include a configuration parameter of the secondary node that is expected by the terminal device.

For example, when the power consumption of the terminal device is relatively high, the terminal device reports terminal device assistance information used to reduce the power consumption. If the terminal device reports terminal device assistance information of the master node, the terminal device assistance information may include a configuration parameter of the master node that is expected by the terminal device. If the terminal device reports terminal device assistance information of the secondary node, the terminal device assistance information may include a configuration parameter of the secondary node that is expected by the terminal device.

Optionally, the first assistance information and the second assistance information may be carried in a same message or different messages. For example, the second assistance information sent by the terminal device to the master node may be carried in terminal device assistance information (UE assistance information), and the first assistance information sent by the terminal device to the master node may be carried in an uplink information transfer MRDC (UL Information Transfer MRDC) message.

Optionally, after receiving the first assistance information and the second assistance information, the master node sends the first assistance information to the secondary node. Alternatively, the master node may obtain the first assistance information from only a message carrying the first assistance information and the second assistance information, and forward the first assistance information to the secondary node without processing the message, and the secondary node obtains the first assistance information. Alternatively, after obtaining the first assistance information from a message carrying the first assistance information and the second assistance information, the master node may process the first assistance information, and then send the first assistance information to the secondary node through another message carrier. This is not limited in this application.

With reference to the second aspect and the foregoing implementations, in some possible implementations, the first network device is a secondary node device in dual connectivity, and the second network device is a master node device in dual connectivity.

With reference to the second aspect and the foregoing implementations, in some possible implementations, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

With reference to the second aspect and the foregoing implementations, in some possible implementations, the first assistance information includes at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

According to a third aspect, an information transmission method is provided. The method includes: A first network device receives first assistance information sent by a second network device, where the first assistance information is used to indicate a configuration parameter requested by the terminal device from the first network device; and the first network device configures a parameter for the terminal device based on the first assistance information.

With reference to the third aspect, in some possible implementations, before the first network device receives the first assistance information sent by the second network device, the method further includes: The first network device receives first information sent by the second network device, where the first information is used to indicate whether the terminal device supports reporting of the first assistance information.

With reference to the third aspect and the foregoing implementations, in some possible implementations, when the first network device determines that the terminal device supports reporting of the first assistance information, the method further includes: The first network device sends second information to the second network device, or the first network device sends the second information to the terminal device, where the second information is used to indicate that the terminal device can report the first assistance information.

With reference to the third aspect and the foregoing implementations, in some possible implementations, the first network device is a secondary node device in dual connectivity, and the second network device is a master node device in dual connectivity.

With reference to the third aspect and the foregoing implementations, in some possible implementations, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

With reference to the third aspect and the foregoing implementations, in some possible implementations, the first assistance information includes at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

With reference to the third aspect and the foregoing implementations, in some possible implementations, when the first network device is the secondary node device in dual connectivity, and the first assistance information includes any one of the quantity of uplink secondary cells, the quantity of downlink secondary cells, the uplink aggregated bandwidth, and the downlink aggregated bandwidth, the method further includes: The first network device skips obtaining any one of the quantity of uplink secondary cells, the quantity of downlink secondary cells, the uplink aggregated bandwidth, and the downlink aggregated bandwidth.

By using the foregoing steps, the secondary node obtains a configuration parameter expected by the terminal device, and the secondary node may configure a communication parameter for the terminal device, to resolve or alleviate the overheating problem of the terminal device or reduce the power consumption of the terminal device.

In a possible implementation, the first assistance information received by the secondary node from the terminal device includes only assistance information for adjusting a configuration of the secondary node. To be specific, after receiving the first assistance information, the secondary node may determine to adjust the configuration of the secondary node, and does not need to perform any configuration negotiation with the master node.

Specifically, the implementation process may include the following plurality of cases:

(1) The secondary node receives the first assistance information from the terminal device, where the first assistance information does not include any one of a maximum quantity of uplink secondary cells, a maximum quantity of downlink secondary cells, a maximum quantity of uplink secondary component carriers, a maximum quantity of downlink secondary component carriers, a maximum uplink aggregated bandwidth, and a maximum downlink aggregated bandwidth that are expected by the terminal device. The maximum uplink aggregated bandwidth may include either or both of a maximum uplink aggregated bandwidth of a low frequency FR1 and a maximum uplink aggregated bandwidth of a high frequency FR2, and the maximum downlink aggregated bandwidth may include either or both of a maximum downlink aggregated bandwidth of the low frequency FR1 and a maximum downlink aggregated bandwidth of the high frequency FR2.

It should be understood that the first assistance information may not include any one of the foregoing information. When the terminal device reports the overheating assistance information to the master node after the overheating problem occurs on the terminal device, the secondary node may still obtain the configuration parameter expected by the terminal device in the overheating assistance information sent to the master node.

Alternatively, when the terminal device needs to reduce the power consumption and report the power consumption assistance information, the secondary node may still obtain, through the master node, the configuration parameter expected by the terminal device in the power consumption assistance information.

(2) If the first assistance information received by the secondary node from the terminal device includes any one of a maximum quantity of uplink secondary cells, a maximum quantity of downlink secondary cells, a maximum quantity of uplink secondary component carriers, a maximum quantity of downlink secondary component carriers, a maximum uplink aggregated bandwidth, and a maximum downlink aggregated bandwidth that are expected by the terminal device, the secondary node may automatically ignore the information.

It should be understood that the first assistance information may include any one of the foregoing information. When the terminal device reports the overheating assistance information to the master node after the overheating problem occurs on the terminal device, the secondary node may still obtain the configuration parameter expected by the terminal device in the overheating assistance information sent to the master node, and ignore, based on the configuration parameter expected by the terminal device in the overheating assistance information sent to the master node, the configuration parameter requested by the terminal device in the first assistance information.

Alternatively, when the terminal device needs to reduce the power consumption and report the power consumption assistance information, the secondary node may still obtain, through the master node, the configuration parameter expected by the terminal device in the power consumption assistance information, and ignore, based on the configuration parameter expected by the terminal device in the power consumption assistance information sent to the master node, the configuration parameter requested by the terminal device in the first assistance information.

(3) If the first assistance information received by the secondary node from the terminal device includes any one of a maximum quantity of uplink secondary cells, a maximum quantity of downlink secondary cells, a maximum quantity of uplink secondary component carriers, a maximum quantity of downlink secondary component carriers, a maximum uplink aggregated bandwidth, and a maximum downlink aggregated bandwidth that are expected by the terminal device, the secondary node may consider that the information is applied only to the secondary node side, and is not applied to both the master node side and the secondary node side.

Specifically, the maximum quantity of uplink secondary cells is a maximum quantity of uplink secondary cells on the secondary node side, the maximum quantity of downlink secondary cells is a maximum quantity of downlink secondary cells on the secondary node side, the maximum quantity of uplink secondary component carriers is a maximum quantity of uplink secondary component carriers on the secondary node side, the maximum quantity of downlink secondary component carriers is a maximum quantity of downlink secondary component carriers on the secondary node side, the maximum uplink aggregated bandwidth is a maximum uplink aggregated bandwidth on the secondary node side, and the maximum downlink aggregated bandwidth is a maximum downlink aggregated bandwidth on the secondary node side.

It should be understood that the first assistance information may include any one of the foregoing information. When the terminal device reports the overheating assistance information after the overheating problem occurs on the terminal device, the secondary node may coordinate with the master node still based on the configuration parameter currently expected by the terminal device in the first assistance information, instead of the configuration parameter requested by the terminal device in the first assistance information.

Alternatively, when the terminal device needs to reduce the power consumption and report the power consumption assistance information, the secondary node may coordinate with the master node still based on the configuration parameter currently expected by the terminal device in the first assistance information, instead of the configuration parameter requested by the terminal device in the first assistance information.

Specifically, when the assistance information received by the NR secondary node does not include only the first assistance information for adjusting the configuration of the NR secondary node, in other words, after receiving the first assistance information, the NR secondary node may further receive other assistance information used to adjust the configuration parameter. In this case, the NR secondary node further needs to perform configuration negotiation with the LTE master node. Therefore, the NR secondary node may initiate configuration coordination between the master node and the secondary node. This is not limited in this application.

In conclusion, according to the information transmission method provided in this embodiment of this application, the terminal device reports the first assistance information to the secondary node and/or reports the second assistance information to the master node. In a process in which the master node and the secondary node configure parameters for the terminal device, the master node and the secondary node may configure the parameters for the terminal device based on respective assistance information without coordination, or the master node coordinates configurations of the master node and the secondary node based on the assistance information reported by the terminal device, to configure the parameter for the terminal device. When the method is applied to a case in which the overheating problem occurs on the terminal device, the base station may configure a new communication parameter for the terminal device based on the overheating assistance information, to effectively resolve the overheating problem of the terminal device. Alternatively, when the method is applied to a case in which the power consumption of the terminal device is relatively high and the power consumption of the terminal device needs to be reduced, the power consumption assistance information is reported, and the base station may configure a new communication parameter for the terminal device based on the power consumption assistance information, to reduce the power consumption of the terminal device.

According to a fourth aspect, an information transmission apparatus is provided. The apparatus includes: a processing unit, configured to determine first assistance information, where the first assistance information is used to indicate a configuration parameter requested from a first network device; and a communications unit, configured to send the first assistance information to a second network device.

With reference to the fourth aspect, in some possible implementations, the communications unit is further configured to send first information to the second network device, where the first information is used to indicate whether the apparatus supports reporting of the first assistance information.

With reference to the fourth aspect and the foregoing implementations, in some possible implementations, when the first information is used to indicate that the apparatus supports reporting of the first assistance information, the communications unit is further configured to receive second information sent by the second network device, or the communications unit is further configured to receive second information sent by the first network device, where the second information is used to indicate that the apparatus can report the first assistance information.

With reference to the fourth aspect and the foregoing implementations, in some possible implementations, the second information is further used to indicate to configure a value of a timer.

Specifically, the timer may be a prohibit timer. The terminal device determines a running period and a non-running period of the prohibit timer based on the value of the timer in the second information. Therefore, the terminal device may send the first assistance information within the non-running period of the prohibit timer, and may not send the first assistance information within the running period of the prohibit timer. This is not limited in this application.

With reference to the fourth aspect and the foregoing implementations, in some possible implementations, the processing unit is further configured to determine second assistance information, where the second assistance information is used to indicate a configuration parameter requested by the apparatus from the second network device; and the communications unit is further configured to send the second assistance information to the second network device.

With reference to the fourth aspect and the foregoing implementations, in some possible implementations, the communications unit is further configured to send third information to the second network device, where the third information is used to indicate whether the apparatus supports reporting of the first assistance information and/or the second assistance information.

With reference to the fourth aspect and the foregoing implementations, in some possible implementations, when the third information is used to indicate that the apparatus supports reporting of the first assistance information and/or the second assistance information, the communications unit is further configured to receive fourth information sent by the second network device, where the fourth information is used to indicate that the apparatus can report the first assistance information and/or the second assistance information.

With reference to the fourth aspect and the foregoing implementations, in some possible implementations, the first information and the third information are a same type of information or different types of information; and/or the second information and the fourth information are a same type of information or different types of information.

With reference to the fourth aspect and the foregoing implementations, in some possible implementations, the first network device is a secondary node device in dual connectivity, and the second network device is a master node device in dual connectivity.

With reference to the fourth aspect and the foregoing implementations, in some possible implementations, the first assistance information is power consumption assistance information, and the power consumption assistance information is used to indicate to reduce power consumption of the apparatus; or the first assistance information is overheating assistance information, and the overheating assistance information is used to indicate to resolve an overheating problem of the apparatus.

With reference to the fourth aspect and the foregoing implementations, in some possible implementations, the first assistance information includes at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the apparatus, an antenna domain configuration parameter of the apparatus, a discontinuous reception DRX configuration parameter of the apparatus, a physical downlink control channel PDCCH monitoring parameter of the apparatus, a search space configuration parameter of the apparatus, a maximum quantity of blind detection times of the apparatus, activation information of a secondary cell or a secondary cell group of the apparatus, a measurement-related parameter of the apparatus, and the RRC connection release request parameter.

According to a fifth aspect, an information transmission apparatus is provided. The apparatus includes a communications unit, configured to receive first assistance information sent by a terminal device, where the first assistance information is used to indicate a configuration parameter requested by the terminal device from a first network device. The communications unit is further configured to send the first assistance information to the first network device.

With reference to the fifth aspect, in some possible implementations, before receiving the first assistance information sent by the terminal device, the communications unit is further configured to receive first information sent by the terminal device, where the first information is used to indicate whether the terminal device supports reporting of the first assistance information.

With reference to the fifth aspect and the foregoing implementations, in some possible implementations, the communications unit is further configured to send the first information to the first network device.

With reference to the fifth aspect and the foregoing implementations, in some possible implementations, when the first information is used to indicate that the terminal device supports reporting of the first assistance information, the communications unit is further configured to: receive the second information sent by the first network device, where the second information is used to indicate that the terminal device can report the first assistance information; and send the second information to the terminal device.

With reference to the fifth aspect and the foregoing implementations, in some possible implementations, the communications unit is further configured to receive second assistance information sent by the terminal device, where the second assistance information is used to indicate a configuration parameter requested by the terminal device from a second network device. The apparatus further includes a processing unit, configured to configure a parameter for the terminal device based on the second assistance information.

With reference to the fifth aspect and the foregoing implementations, in some possible implementations, the communications unit is further configured to receive third information sent by the terminal device, where the third information is used to indicate whether the terminal device supports reporting of the first assistance information and/or the second assistance information.

With reference to the fifth aspect and the foregoing implementations, in some possible implementations, when the third information is used to indicate that the terminal device supports reporting of the first assistance information and/or the second assistance information, the communications unit is further configured to receive fourth information sent by the terminal device, where the fourth information is used to indicate that the terminal device can report the second assistance information.

With reference to the fifth aspect and the foregoing implementations, in some possible implementations, the first network device is a secondary node device in dual connectivity, and the second network device is a master node device in dual connectivity.

With reference to the fifth aspect and the foregoing implementations, in some possible implementations, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

With reference to the fifth aspect and the foregoing implementations, in some possible implementations, the first assistance information includes at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

According to a sixth aspect, an information transmission apparatus is provided. The apparatus includes: a communications unit, configured to receive first assistance information sent by a second network device, where the first assistance information is used to indicate a configuration parameter requested by the terminal device from the apparatus; and a processing unit, configured to configure a parameter for the terminal device based on the first assistance information.

With reference to the sixth aspect, in some possible implementations, before the communications unit receives the first assistance information sent by the second network device, the communications unit is further configured to receive first information sent by the second network device, where the first information is used to indicate whether the terminal device supports reporting of the first assistance information.

With reference to the sixth aspect and the foregoing implementations, in some possible implementations, when the first network device determines that the terminal device supports reporting of the first assistance information, the communications unit is further configured to send second information to the second network device, or send the second information to the terminal device, where the second information is used to indicate that the terminal device can report the first assistance information.

With reference to the sixth aspect and the foregoing implementations, in some possible implementations, the first network device is a secondary node device in dual connectivity, and the second network device is a master node device in dual connectivity.

With reference to the sixth aspect and the foregoing implementations, in some possible implementations, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

With reference to the sixth aspect and the foregoing implementations, in some possible implementations, the first assistance information includes at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

With reference to the sixth aspect and the foregoing implementations, in some possible implementations, when the first network device is the secondary node device in dual connectivity, and the first assistance information includes any one of the quantity of uplink secondary cells, the quantity of downlink secondary cells, the uplink aggregated bandwidth, and the downlink aggregated bandwidth, the processing unit does not obtain any one of the quantity of uplink secondary cells, the quantity of downlink secondary cells, the uplink aggregated bandwidth, and the downlink aggregated bandwidth.

According to a seventh aspect, a communications apparatus is provided, and the communications apparatus has functions of implementing the terminal device in the method designs of the first aspect. The functions may be implemented by hardware, or may be implemented by hardware executing corresponding software. The hardware or the software includes one or more units corresponding to the functions.

According to an eighth aspect, a communications apparatus is provided, and the communications apparatus has functions of implementing the second network device (for example, a master node) in the method designs of the second aspect. The functions may be implemented by hardware, or may be implemented by hardware executing corresponding software. The hardware or the software includes one or more units corresponding to the functions.

According to a ninth aspect, a communications apparatus is provided, and the communications apparatus has functions of implementing the first network device (for example, a secondary node) in the method designs of the third aspect.

The functions may be implemented by hardware, or may be implemented by hardware executing corresponding software. The hardware or the software includes one or more units corresponding to the functions.

According to a tenth aspect, a terminal device is provided, and includes a transceiver and a processor. Optionally, the terminal device further includes a memory. The processor is configured to control the transceiver to send and receive a signal. The memory is configured to store a computer program. The processor is configured to invoke the computer program from the memory and run the computer program, so that the terminal device performs the method according to any one of the first aspect and the possible implementations of the first aspect.

According to an eleventh aspect, a network device is provided, and includes a transceiver and a processor. Optionally, the network device further includes a memory. The processor is configured to control the transceiver to send and receive a signal. The memory is configured to store a computer program. The processor is configured to invoke the computer program from the memory and run the computer program, so that the network device performs the method according to any one of the second aspect and the possible implementations of the second aspect.

According to a twelfth aspect, a network device is provided, and includes a transceiver and a processor. Optionally, the network device further includes a memory. The processor is configured to control the transceiver to send and receive a signal. The memory is configured to store a computer program. The processor is configured to invoke the computer program from the memory and run the computer program, so that the network device performs the method according to any one of the third aspect and the possible implementations of the third aspect.

According to a thirteenth aspect, a communications system is provided. The system includes the apparatus according to the fourth aspect, the apparatus according to the fifth aspect, and the apparatus according to the sixth aspect; the system includes the communications apparatus according to the seventh aspect, the communications apparatus according to the eighth aspect, and the communications apparatus according to the ninth aspect; or the system includes the terminal device according to the tenth aspect, the network device according to the eleventh aspect, and the network device according to the twelfth aspect.

According to a fourteenth aspect, a communications apparatus is provided. The communications apparatus may be the terminal device in the foregoing method designs, or may be a chip disposed in the terminal device. The communications apparatus includes a processor coupled to a memory, and the processor may be configured to execute instructions in the memory, to implement the method performed by the terminal device according to any one of the first aspect and the possible implementations of the first aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to a fifteenth aspect, a communications apparatus is provided. The communications apparatus may be the network device in the foregoing method designs, or may be a chip disposed in the network device. The communications apparatus includes a processor coupled to a memory, and the processor may be configured to execute instructions in the memory, to implement the method performed by the network device according to any one of the second aspect and the possible implementations of the second aspect, or to implement the method performed by the network device according to any one of the third aspect and the possible implementations of the third aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a sixteenth aspect, a computer program product is provided. The computer program product includes computer program code, and when the computer program code is run on a computer, the computer is enabled to perform the methods in the foregoing aspects.

According to a seventeenth aspect, a computer-readable medium is provided. The computer-readable medium stores program code, and when the computer program code is run on a computer, the computer is enabled to perform the methods in the foregoing aspects.

DETAILED DESCRIPTION OF ILLUSTRATIVE EMBODIMENTS

The following describes technical solutions of this application with reference to the accompanying drawings.

It should be understood that manner division, case division, type division, and embodiment division in the embodiments of this application are merely for ease of description, but should not constitute any special limitation, and features in various manners, types, cases, and embodiments may be combined when there is no contradiction.

It should be further understood that the terms "first", "second", and "third" in the embodiments of this application are merely used for distinguishing, and should not be construed as any limitation on this application. For example, "first overheating assistance information" and "second overheating assistance information" in the embodiments of this application indicate overheating assistance information including different types of information content.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further noted that "at least one" means one or more, "a plurality of" means two or more, and "at least one item (piece) of the following" or a similar expression thereof means any combination of these items, including a singular item (piece) or any combination of plural items (pieces). For example, at least one (piece) of a, b, or c may represent: a, b, c, a and b, a and c, b and c, or a, b, and c, where a, b, and c may be singular or plural.

It should be further noted that the term "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects. A and B may be singular or plural. The character "/" generally indicates an "or" relationship between the associated objects.

The technical solutions provided in this application are described in detail below with reference to the accompanying drawings.

The technical solutions in the embodiments of this application may be applied to various communications systems, for example, a long term evolution (long term evolution, LTE) system, an LTE frequency division duplex (frequency division duplex, FDD) system, an LTE time division duplex (time division duplex, TDD) system, a fifth generation (5th generation, 5G) mobile communications system or a new radio (new radio, NR) communications system, and a future mobile communications system.

Figure 1:
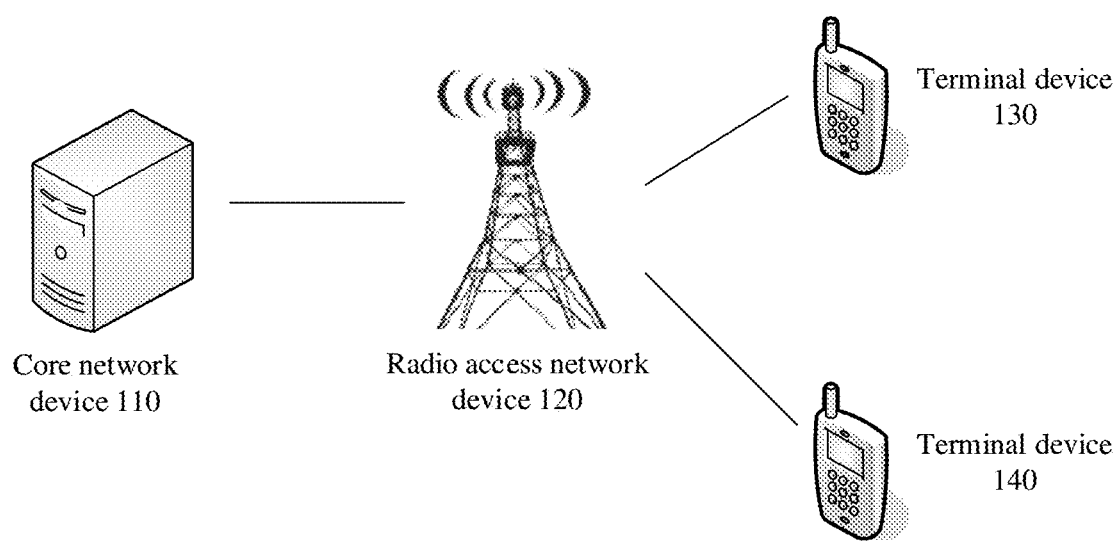
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system 100 may include a core network device 110, a radio access network device 120, and at least one terminal device (for example, a terminal device 130 and a terminal device 140 shown in FIG. 1). The terminal device is connected to the radio access network device in a wireless manner, and the radio access network device is connected to the core network device in a wireless or wired manner. The core network device and the radio access network device may be different physical devices independent of each other, or functions of the core network device and logical functions of the radio access network device may be integrated into a same physical device, or some functions of the core network device and some functions of the radio access network device may be integrated into one physical device. The terminal device may be at a fixed position or may be movable. FIG. 1 is merely a schematic diagram. The communications system may further include another network device, for example, may further include a wireless relay device and a wireless backhaul device, which are not drawn in FIG. 1. Quantities of core network devices, radio access network devices, and terminal devices included in the mobile communications system are not limited in the embodiments of this application.

In the mobile communications system 100, the radio access network device 120 is an access device, in the mobile communications system, that is connected to the terminal device in a wireless manner. The radio access network device 120 may be a base station, an evolved NodeB (evolved nodeB, eNB), a home NodeB, an access point (access point, AP) in a wireless fidelity (wireless fidelity, WIFI) system, a wireless relay node, a wireless backhaul node, a transmission point (transmission point, TP), a transmission reception point (transmission reception point, TRP), or the like, or may be a gNodeB (gNode B, gNB) in an NR system, or may be a component or a part of a device included in a base station, for example, a central unit (central unit, CU), a distributed unit (distributed unit, DU), or a baseband unit (baseband unit, BBU). It should be understood that a specific technology and a specific device form used by the radio access network device are not limited in the embodiments of this application. In this application, the radio access network device is briefly referred to as a network device. Unless otherwise specified, all network devices are radio access network devices in this application. In this application, the network device may be a network device, or may be a chip applied to a network device to complete a radio communication processing function.

The terminal device in the mobile communications system 100 may also be referred to as a terminal (Terminal), user equipment (user equipment, UE), a mobile station (mobile station, MS), a mobile terminal (mobile terminal, MT), or the like. The terminal device in the embodiments of this application may be a mobile phone (mobile phone), a tablet computer (Pad), or a computer with a wireless sending and receiving function, or may be a wireless terminal device applied to a virtual reality (virtual reality, VR) scenario, an augmented reality (augmented reality, AR) scenario, an industrial control (industrial control) scenario, a self driving (self driving) scenario, a remote medical (remote medical) scenario, a smart grid (smart grid) scenario, a transportation safety (transportation safety) scenario, a smart city (smart city) scenario, a smart home (smart home) scenario, or the like. In this application, the foregoing terminal device and a chip applied to the foregoing terminal device are collectively referred to as a terminal device. It should be understood that a specific technology and a specific device form that are used by the terminal device are not limited in the embodiments of this application.

The embodiments of this application may be applied to downlink data transmission, or may be applied to uplink data transmission, or may be applied to device-to-device (device to device, D2D) data transmission. During downlink data transmission, a data sending device is a network device, and a data receiving device is a terminal device. After receiving downlink data, the terminal device sends feedback information to the network device, to notify the network device whether the downlink data is correctly received by the terminal device. During uplink data transmission, a data sending device is a terminal device, and a data receiving device is a network device. After receiving uplink data, the network device sends feedback information to the terminal device, to notify the terminal device whether the uplink data is correctly received by the network device. During D2D signal transmission, a data sending device is a terminal device, and a data receiving device is also a terminal device. A data transmission direction is not limited in the embodiments of this application.

In an initial phase of the fifth generation (fifth generation, 5G) mobile communications system, because a fourth generation (forth generation, 4G) mobile communications system network and a 5G new radio (new radio, NR) communications system network coexist, to make full use of an existing 4G network, an operator deploys a network that simultaneously provides service transmission for a terminal device over a 4G access network, that is, an evolved UMTS terrestrial radio access network (evolved UMTS terrestrial radio access network, E-UTRAN), and a 5G access network (NR), or may deploy a network that simultaneously provides service transmission for a terminal device over two 5G NR access networks. This type of network architecture in which two access network devices simultaneously provide service transmission for a terminal device is referred to as multi-radio dual connectivity (multi-radio dual connectivity, MR-DC).

Figure 2A:
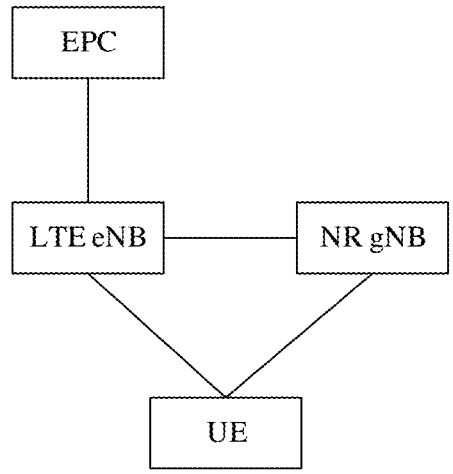
FIG. 2(a) to FIG. 2(d) are a schematic architectural diagram of a dual connectivity communications system according to an embodiment of this application.

Specifically, a network architecture shown in FIG. 2(a) is a dual connectivity (E-UTRAN-NR dual connectivity, EN-DC) mode in which an LTE eNodeB (eNB) is a master node (master node), an NR gNodeB (gNB) is a secondary node (secondary node), and the master node is connected to a 4G core network (evolved packet core, EPC).

Figure 2B:
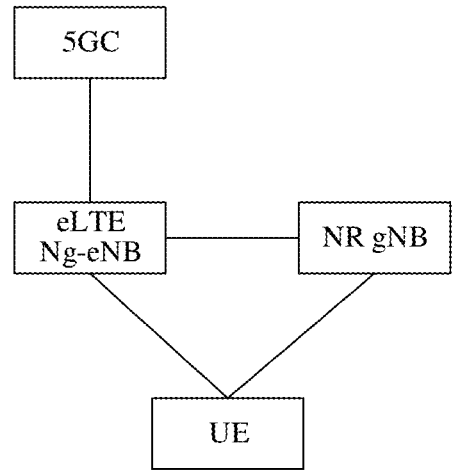

A network architecture shown in FIG. 2(b) is a dual connectivity (NG-RAN E-UTRA-NR dual connectivity, NGEN-DC) mode in which an evolved LTE eNodeB (next generation evolved node B, Ng-eNB) is a master node, an NR gNodeB (gNB) is a secondary node, and the master node is connected to a 5G core network (5G core, 5GC).

Figure 2C:
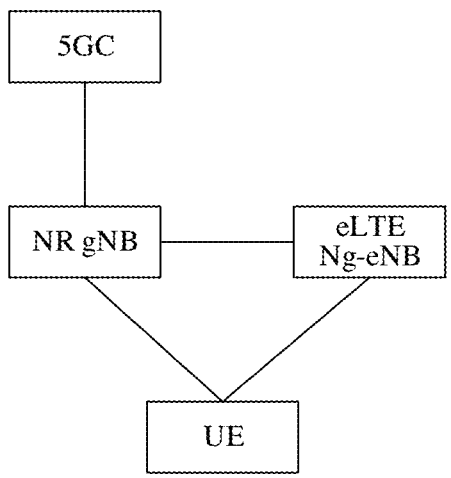

A network architecture shown in FIG. 2(c) is a dual connectivity (NR-E-UTRA dual connectivity, NE-DC) mode in which an NR gNodeB is a master node, an LTE eNodeB is a secondary node, and the master node is connected to a 5G core network.

Figure 2D:
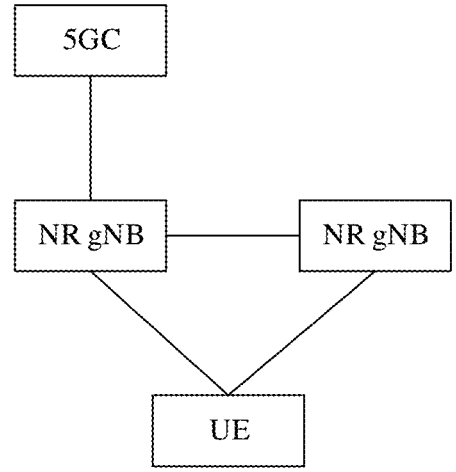

A network architecture shown in FIG. 2(d) is a dual connectivity (NR-NR dual connectivity, NR-DC) mode in which one NR gNodeB is a master node, the other NR gNodeB is a secondary node, and the master node is connected to a 5G core network.

In addition to the dual connectivity network architectures shown in FIG. 2(a) to FIG. 2(d), there may be more network architectures, for example, NR standalone (standard alone, SA) networking, namely, a connection mode in which an NR gNodeB works independently and the NR gNodeB is connected to a 5G core network (NR SA), or 4G standalone networking (long term evolution standard alone, LTE SA), namely, a connection mode in which an LTE eNodeB works independently and the LTE eNodeB is connected to a 4G core network. It should be understood that the dual connectivity network architecture is used as an example in this application to describe an information transmission method. This is not limited in this application.

As described in the background, during high-speed data transmission, an overheating problem may occur on the terminal device. When the overheating problem occurs on the terminal device, the overheating problem may be resolved by lowering a capability or a configuration of the terminal device. In this case, the terminal device may report terminal device assistance information (UE assistance information) to notify a network device of a capability or a configuration that the terminal device expects to lower, for reference by the base station to perform reconfiguration.

Alternatively, during high-speed data transmission, power consumption of the terminal device may be relatively high. When the power consumption of the terminal device is relatively high and there is a power saving requirement, the power consumption of the terminal device may be reduced by lowering a capability or a configuration of the terminal device. In this case, the terminal device may report terminal device assistance information (UE assistance information) to notify a network device of a capability or a configuration that the terminal device expects to lower, for reference by the base station to perform reconfiguration.

Figure 3:
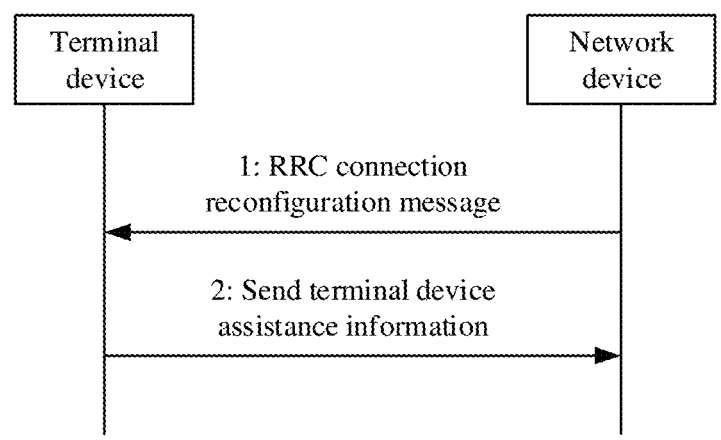
FIG. 3 is a schematic flowchart in which a terminal device sends assistance information to a network device according to an embodiment of this application.

FIG. 3 is a schematic flowchart in which a terminal device sends assistance information to a network device according to an embodiment of this application. Steps in FIG. 3 include step 301 and step 302. The following describes these steps in detail.

301: A network device sends a radio resource control (radio resource control, RRC) connection reconfiguration message to a terminal device.

Specifically, the RRC connection reconfiguration message may include overheating-related configuration information, for example, information used to indicate whether the terminal device can send the overheating assistance information to the network device, and a value of an overheating-related prohibit timer.

It should be understood that whether the terminal device can send the overheating assistance information to the network device may be capability information of the terminal device. In other words, when the terminal device can send the overheating assistance information to the network device, the terminal device has a capability of sending the overheating assistance information. On the contrary, when the terminal device cannot send the overheating assistance information to the network device, the terminal device does not have a capability of sending the overheating assistance information, or the terminal device has a capability of sending the overheating assistance information, but the network device indicates the terminal device not to send the overheating assistance information to the network device. This is not limited in this application.

It should be further understood that the value of the prohibit timer in this application may be used to determine a running period and a non-running period of the prohibit timer. For example, the terminal device does not send any overheating assistance information to the network device within the running period of the overheating-related prohibit timer, and the terminal device may send any overheating assistance information to the network device beyond the running period of the overheating-related prohibit timer.

302: The terminal device sends assistance information to the network device.

In step 301, if the network device configures that the terminal device can send the overheating assistance information, when an overheating problem occurs on the terminal device and the overheating-related prohibit timer is not in the running period, the terminal device may send the assistance information to the network device, where the assistance information is the overheating assistance information of the terminal device and is used by the network device to resolve the overheating problem of the terminal device.

For the four different scenarios of the MR-DC network architecture described in FIG. 2(a) to FIG. 2(d), the terminal device reports different overheating assistance information.

Specifically, when the terminal device works in the EN-DC scenario shown in FIG. 2(a) or the (NG) EN-DC scenario shown in FIG. 2(b), the overheating assistance information reported by the terminal device may include at least one of the following:

(1) Uplink (uplink, UL) and/or downlink (downlink, DL) terminal device category (UE category)

The terminal device category may include information about a maximum quantity of multiple-input multiple-output radio antenna layers (multiple-input multiple-output layer, MIMO layer), and may further include bandwidth information and other information related to a transmission rate. This is not limited in this application.

(2) Maximum quantity of UL and/or DL secondary component carriers (component carrier, CC) or maximum quantity of UL and/or DL secondary cells (secondary cell, Scell) supported by the terminal device When the terminal device works in the NE-DC scenario shown in FIG. 2(c) or the NR-DC scenario shown in FIG. 2(d), the overheating assistance information reported by the terminal device may include at least one of the following:

(1) a maximum quantity of UL and/or DL secondary component carriers or a maximum quantity of UL and/or DL Scells supported by the terminal device;

(2) a maximum quantity of UL and/or DL MIMO layers of each serving cell in each frequency range (frequency range, FR) supported by the terminal device; and (3) a maximum UL and/or DL aggregated bandwidth of each frequency range FR supported by the terminal device.

In this application, the frequency range may include a low frequency FR1 and a high frequency FR2. For example, the FR1 may be a frequency band whose frequency band range is less than 6 GHz, and the FR2 may be a frequency band whose frequency band range is greater than 6 GHz.

Currently, in the EN-DC scenario or the NGEN-DC scenario, the terminal device category reported by the terminal device can only be used to adjust a configuration on a master node (LTE eNodeB) side, and the maximum quantity of Scells reported by the terminal device can only be used to adjust a quantity of secondary component carriers or a quantity of Scells on the master node side and a secondary node (NR gNodeB) side. However, even if an NR secondary node is reduced to one Scell, the NR secondary node may still be provided with a very high bandwidth, or a very large quantity of MIMO layers, or a plurality of antenna ports (antenna panel/port), or the like. For example, a bandwidth configured for the NR secondary node is usually 100M, and a bandwidth configured for an LTE master node may be 20M. After the terminal device reports the overheating assistance information, the bandwidth of the LTE master node is reduced to 20M, but the bandwidth of the NR secondary node is still 100M. Consequently, power consumption of the NR secondary node is still very high, and the overheating problem of the terminal device cannot be effectively resolved.

In addition, for power consumption of a base station in a DC scenario, power consumption of an NR gNodeB is far greater than that of an LTE eNodeB. Therefore, when the overheating problem occurs on the terminal device, if the power consumption of the NR gNodeB cannot be reduced, a configuration of the NR gNodeB is adjusted. Consequently, the power consumption of the NR gNodeB is still very high, the overheating problem of the terminal device of the NR gNodeB cannot be effectively resolved, and the power consumption of the terminal device of the NR gNodeB cannot be effectively reduced.

For the foregoing problems, this application provides an information transmission method. According to the method, when an overheating problem occurs on a terminal device, the terminal device may report overheating-related assistance information of the terminal device to a network device. Specifically, the terminal device may not only report the overheating-related assistance information to a network device on a master node side, but also report the overheating-related assistance information to a network device on a secondary node side, so that the secondary node can perform configuration on the secondary node based on the assistance information, to resolve the overheating problem of the terminal device.

In addition, it should be understood that the information transmission method provided in this application not only can be applied to a scenario in which the overheating problem occurs on the terminal device to resolve the overheating problem of the terminal device, but also can be used to reduce power consumption of the terminal device. When the power consumption of the terminal device is relatively high and the power consumption of the terminal device needs to be reduced, power consumption assistance information for reducing the power consumption of the terminal device may be reported to the secondary node by using the information transmission method provided in the embodiments of this application, so that the secondary node can perform configuration on the secondary node based on the assistance information; or power consumption assistance information for reducing the power consumption of the terminal device may be reported to the master node, so that both the master node and the secondary node can perform parameter configuration based on the assistance information to reduce the power consumption of the terminal device. A scenario to which the information transmission method is applied is not limited in this application.

Figure 4:
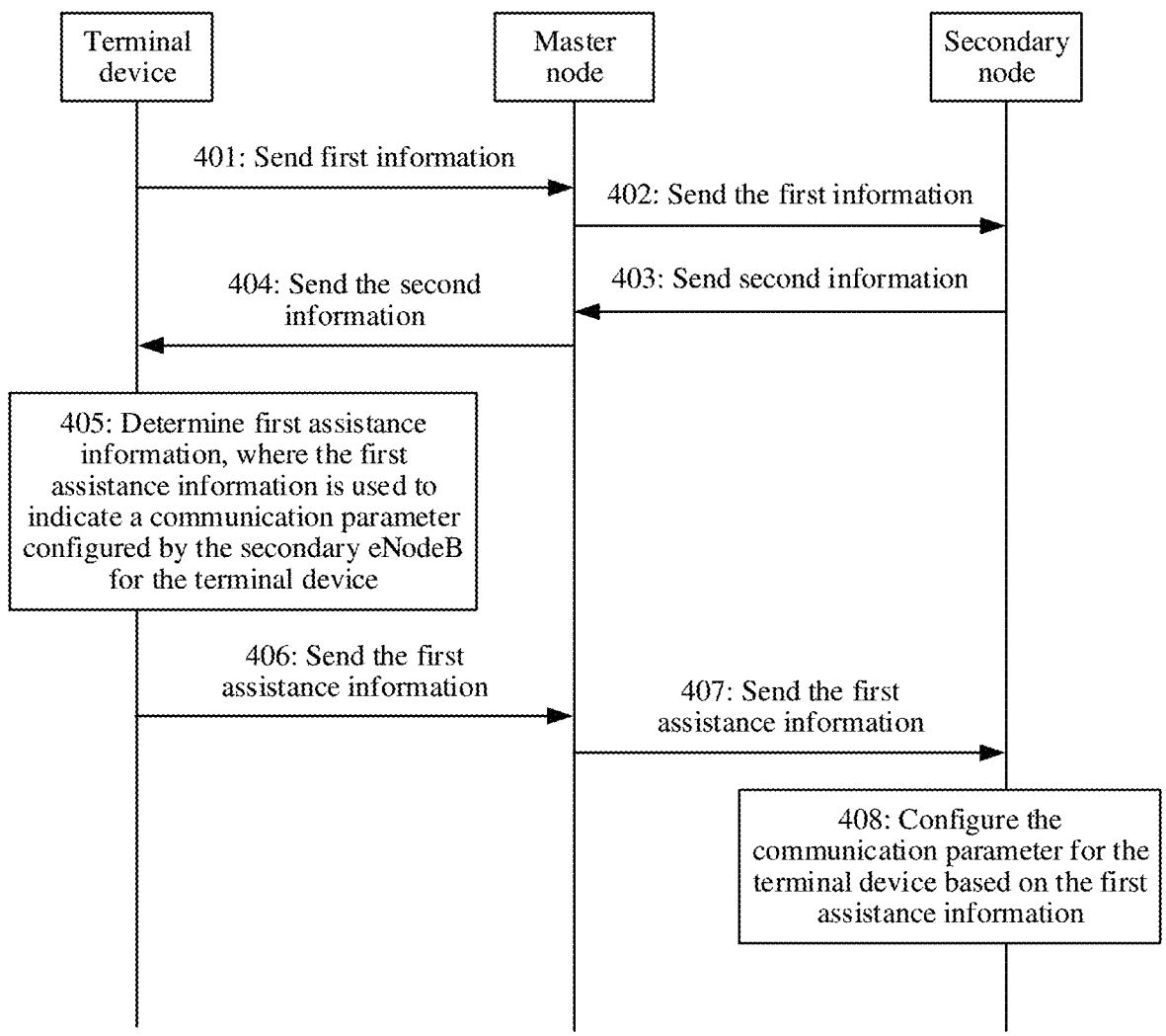
FIG. 4 is a schematic interaction diagram of an information transmission method according to an embodiment of this application.

FIG. 4 is a schematic interaction diagram of an information transmission method 400 according to an embodiment of this application. The following describes steps of the method 400 in detail.

It should be understood that, in this embodiment of this application, the method 400 is described by using an example in which a terminal device and network devices (for example, a master node and a secondary node) perform the method 400. By way of example and not limitation, the method 400 may alternatively be performed by a chip used in the terminal device and chips used in the master node and the secondary node.

It should be further understood that the information transmission method provided in this embodiment of this application is not limited to any network connection architecture, for example, is not limited to any possible network connection form enumerated in FIG. 2(a) to FIG. 2(d). This is not limited in this application.

401: The terminal device sends first information to the master node. Correspondingly, the master node receives the first information sent by the terminal device.

402: The master node sends the first information to the secondary node. Correspondingly, the secondary node receives the first information sent by the master node.

Specifically, if an overheating problem occurs on the terminal device, the terminal device may report overheating assistance information to the network device; or when the terminal device needs to reduce power consumption, the terminal device may report power consumption assistance information related to power consumption reduction to the network device. In this application, the information reported by the terminal device in the foregoing two scenarios is referred to as assistance information.

In the descriptions of this embodiment of this application, assistance information reported by the terminal device to the secondary node is referred to as "first assistance information", and assistance information reported by the terminal device to the master node is referred to as "second assistance information". In other words, the first assistance information is used to indicate a configuration parameter requested by the terminal device from the secondary node, and the second assistance information is used to indicate a configuration parameter requested by the terminal device from the master node. Before the terminal device reports the assistance information, the terminal device can report the assistance information only when two conditions are met.

The first condition is that the terminal device has a capability of reporting the assistance information to the network device, and the capability of reporting the assistance information may be an optional function of the terminal device. During actual implementation of the terminal device, some terminal devices select to develop this function. In this case, the terminal device has the capability of reporting the assistance information. Otherwise, the terminal device does not have the capability of reporting the assistance information. In this application, it is considered by default that the terminal device has the capability of reporting the assistance information.

The second condition is that the network device allows the terminal device to report the assistance information. Therefore, before reporting the assistance information, the terminal device may report, to the network device, the message used to indicate whether the terminal device supports reporting of the assistance information.

In a possible implementation, before reporting the assistance information, the terminal device may first report the information used to indicate whether the terminal device supports reporting of the assistance information, and the information is referred to as "first information" in this application. The first information may be understood as capability information reported by the terminal device. In a process in which the terminal device sends the first information to the master node, the first information may be carried in a terminal device capability information (UE capability information) message, and the terminal device capability information message indicates a radio access capability of the terminal device.

In a possible implementation, the first information is used to indicate whether the terminal device supports reporting of the first assistance information.

It should be understood that the first information herein may be used to indicate a capability of the terminal device to report the first assistance information to the secondary node, and the secondary node may determine, based on the first information, whether the terminal device has the capability of reporting the first assistance information. The master node side may have separate capability information to indicate a capability of the terminal device to report the related assistance information to the master node. This is not limited in this application.

Optionally, the first information may be carried in an NR capability (UE-NR-capability) in the terminal device capability information message, in other words, carried in an NR capability container (container). Specifically, an indication message indicating whether the terminal device supports reporting of the assistance information is included in the NR capability container container. The terminal device sends the NR capability container container to the master node, and then the master node forwards the NR capability container to the secondary node, so that the secondary node can obtain the first information to determine whether the terminal device supports reporting of the assistance information.

It should be understood that, in step 401 and step 402, the master node may forward only the first information sent by the terminal device to the secondary node, and the master node may not obtain content of the first message and may not process the first information, or may process the first information and then send the first information to the secondary node through another message carrier. This is not limited in this application.

Optionally, the first information may be carried in an MRDC capability (UE-MRDC-Capability) in the terminal device capability information message, in other words, carried in an MRDC capability container (container). Specifically, an indication message indicating whether the terminal device supports reporting of the assistance information is included in the MRDC capability container container. The terminal device sends the MRDC capability container container to the master node, and then the master node forwards the MRDC capability container to the secondary node, so that the master node and/or the secondary node can obtain the first information to determine whether the terminal device supports reporting of the assistance information.

It should be understood that, in step 401 and step 402, the master node may forward only the first information sent by the terminal device to the secondary node, and the master node may not obtain content of the first information and may not process the first information, or may process the first information and then send the first information to the secondary node through another message carrier. This is not limited in this application.

403: The secondary node sends second information to the master node. Correspondingly, the master node receives the second information sent by the secondary node.

404: The master node sends the second information to the terminal device. Correspondingly, the terminal device receives the second information sent by the master node.

Specifically, the second information may be configuration information of the secondary node, and the second information is used to indicate that the terminal device is allowed to report the first assistance information, or the second information is used to indicate that the terminal device can report the first assistance information. The secondary node may determine, based on the capability information (the first information) reported by the terminal device, that the terminal device supports reporting of the first assistance information, and send the second information to the terminal device to indicate that the terminal device is allowed to report the first assistance information.

It should be understood that the second information is a configuration on a secondary node side for only configuring sending of the first assistance information on the secondary node side. There may be a separate configuration such as similar configuration information on the master node side for configuring sending of the related assistance information (the second assistance information) on the master node side. When the master node sends the configuration information on the master node side to the terminal device, it indicates that the terminal device is allowed to report the related assistance information (the second assistance information) on the master node side. This is not limited in this application.

Optionally, the second information is further used to indicate to configure a value of a timer for the terminal device. Specifically, the timer may be a prohibit timer. The terminal device determines a running period and a non-running period of the prohibit timer based on the value of the timer in the second information. Therefore, the terminal device may send the first assistance information within the non-running period of the prohibit timer, and may not send the first assistance information within the running period of the prohibit timer. This is not limited in this application.

It should be understood that the timer is a timer used on the secondary node side for only controlling sending of the first assistance information on the secondary node side. There may be an independently used timer such as a similar prohibit timer on the master node side for controlling sending of the related assistance information (the second assistance information) on the master node side. This is not limited in this application.

Content of the second information is described above. In a process of sending the second information, the second information sent by the master node to the terminal device may be carried in an RRC connection reconfiguration message.

For example, when a signaling radio bearer (signaling radio bearer, SRB3) is configured for the terminal device. In other words, some RRC messages between the terminal device and the secondary node may be directly sent between the terminal device and the secondary node through the SRB3. In this case, the secondary node may directly send the second information to the terminal device through the SRB3.

It should be understood that the SRB is used to transmit a radio resource control (radio resource control, RRC) message, and the RRC message may be transmitted on an SRB0, an SRB1, an SRB2, or the SRB3. The SRB3 is used to transmit an RRC message between the terminal device and the secondary node, for example, a measurement report (measurement report) and failure information (failure information).

For example, when the SRB3 is not configured for the terminal device, the secondary node may send the second information to the terminal device through forwarding by the master node, as shown in step 403 and step 404 in FIG. 4. It should be understood that a type of a message between the master node and the secondary node is not limited in this application.

After receiving the second information, the terminal device determines that the first assistance information can be reported. For example, when the overheating problem occurs on the terminal device and the overheating problem needs to be resolved, the terminal device may report the assistance information related to the overheating problem. Alternatively, when the power consumption is relatively high and the power consumption of the terminal device needs to be reduced, the terminal device may report the power consumption assistance information.

For example, in an EN-DC scenario, the secondary node is an NR gNodeB, and the master node is an LTE eNodeB. The NR gNodeB may send the second information (the configuration information) to the terminal device based on the capability information in the first information reported by the terminal device, configure that the terminal device can report the first assistance information, and configure the value of the prohibit timer in the second information. The NR gNodeB may forward the second information to the terminal device through the LTE eNodeB, or may directly send the second information to the terminal device through the SRB3.

It should be understood that, in step 403 and step 404, the master node may forward only the second information sent by the secondary node to the terminal device, and may not obtain content of the second information and may not process the second information, or may process the second information and then send the second information to the terminal device through another message carrier. This is not limited in this application.

405: The terminal device determines first assistance information, where the first assistance information is used to indicate a configuration parameter requested by the terminal device from the secondary node.

406: The terminal device sends the first assistance information to the master node. Correspondingly, the master node receives the first assistance information sent by the terminal device.

407: The master node sends the first assistance information to the secondary node. Correspondingly, the secondary node receives the first assistance information sent by the master node.

It should be understood that, in this application, the first assistance information includes information used to indicate the configuration parameter requested by the terminal device from the secondary node. In addition, the first assistance information may further include more other information and perform other functions. This is not limited in this application.

In a possible implementation, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

Specifically, the foregoing descriptions are provided: The information transmission method provided in this application may be applied to a scenario in which an overheating problem occurs on the terminal device or a scenario in which the terminal device needs to reduce power consumption. In other words, the information transmission method described in FIG. 4 may be used to resolve the overheating problem of the terminal device or reduce the power consumption of the terminal device.

Specifically, in a process in which the terminal device sends the first assistance information to the master node, the first assistance information may be carried in an uplink information transfer MRDC (ULInformationTransfer-MRDC) message, and the uplink information transfer MRDC message may be considered as a container (container). As an NR uplink dedicated control channel message (ul-DCCH-MessageNR), the first assistance information may be transmitted in the uplink information transfer MRDC message. The uplink information transfer MRDC message may be further used to transmit a measurement report (measurement report) and NR failure information (failure information).

In a possible implementation, no signaling radio bearer (signaling radio bearer, SRB3) is configured for the terminal device. In other words, some RRC messages between the terminal device and the secondary node cannot be directly sent between the terminal device and the secondary node through the SRB3. In this case, the terminal device may send the first assistance information to the secondary node through forwarding by the master node. It should be understood that a type of a message between the master node and the secondary node is not limited in this application.

It should be understood that, in step 406 and step 407, the master node may only forward the first assistance information sent by the terminal device to the secondary node, and may not obtain content of the first assistance information and may not process the first assistance information, or may process the first assistance information and then send the first assistance information to the terminal device through another message carrier. This is not limited in this application.

Specifically, that the first assistance information is used to indicate a configuration parameter requested by the terminal device from the secondary node may be understood as follows: The first assistance information is used to indicate a configuration parameter expected by the terminal device, and the terminal device requests the secondary node to perform configuration based on the configuration parameter expected by the terminal device. Likewise, the second assistance information may also have a similar understanding. That the second assistance information is used to indicate that the terminal device requests a configuration parameter expected by the terminal device from the master node may be specifically understood as follows: The second assistance information is used to indicate a configuration parameter expected by the terminal device and the terminal device requests the master node to perform configuration based on the configuration parameter expected by the terminal device.

Optionally, the first assistance information may include at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

It should be understood that the foregoing enumerated information is all possible information types, and this application includes but is not limited to this.

Specifically, the maximum quantity of uplink MIMO layers may include either or both of a maximum quantity of uplink MIMO layers of a low frequency FR1 and a maximum quantity of uplink MIMO layers of a high frequency FR2; the maximum quantity of downlink MIMO layers may include either or both of a maximum quantity of downlink MIMO layers of the low frequency FR1 and a maximum quantity of downlink MIMO layers of the high frequency FR2; the maximum uplink aggregated bandwidth may include either or both of a maximum uplink aggregated bandwidth of the low frequency FR1 and a maximum uplink aggregated bandwidth of the high frequency FR2, where the maximum uplink aggregated bandwidth may be a maximum aggregated bandwidth of all uplink carriers; the maximum downlink aggregated bandwidth may include either or both of a maximum downlink aggregated bandwidth of the low frequency FR1 and a maximum downlink aggregated bandwidth of the high frequency FR2, where the maximum downlink aggregated bandwidth may be a maximum aggregated bandwidths of all downlink carriers; the processing latency of the terminal device may be, for example, a value of K0 (K0 is a slot interval or a slot difference between a slot in which a physical downlink control channel PDCCH is located and a slot in which a downlink shared channel PDSCH scheduled by the PDCCH is located) or a value of K1 (K1 is a slot interval or a slot difference between a slot in which a PDSCH is located and a slot in which a corresponding HARQ-ACK feedback is located) or a value of K2 (K2 is a slot interval or a slot difference between a slot in which a PDCCH is located and a slot in which an uplink shared channel PUSCH scheduled by the PDCCH is located); the antenna domain configuration parameter of the terminal device may be, for example, a maximum quantity of antenna ports antenna panels/ports (for example, a maximum quantity of uplink antenna ports, a maximum quantity of downlink antenna ports, a maximum quantity of antenna ports of the low frequency FR1, or a maximum quantity of antenna ports of the high frequency FR2); and the discontinuous reception DRX configuration parameter of the terminal device may be, for example, a value of a DRX cycle (for example, a value of a short DRX cycle or a value of a long DRX cycle), or may be a value of an On Duration timer (drx-on Duration Timer), or may be a value of an inactivity timer (drx-Inactivity Timer), or may be a value of another DRX-related timer.

For example, when the terminal device determines that the overheating problem occurs, the first assistance information sent by the terminal device to the secondary node may be the overheating assistance information. The overheating assistance information may include a configuration parameter expected by the terminal device, and the configuration parameter is a configuration parameter used to resolve or alleviate the overheating problem of the terminal device. It should be understood that, when the terminal device establishes a connection to the master node and the secondary node, the master node and the secondary node may obtain a radio communication capability (radio capability) of the terminal device, and a configuration parameter reported by the terminal device in an overheating case is less than a configuration parameter corresponding to the radio communication capability, or a configuration parameter reported by the terminal device in an overheating case is less than a current configuration parameter of the network device.

For example, the first assistance information may include a maximum quantity of uplink MIMO layers and/or a maximum quantity of downlink MIMO layers expected by the terminal device, and the secondary node obtains the maximum quantity of uplink MIMO layers and/or the maximum quantity of downlink MIMO layers expected by the terminal device. For example, in a non-overheating case of the terminal device, the maximum quantity of uplink MIMO layers and/or the maximum quantity of downlink MIMO layers configured by the secondary node for the terminal device is 4. When the overheating problem occurs on the terminal device, a currently expected maximum quantity of uplink MIMO layers and/or a currently expected maximum quantity of downlink MIMO layers that are/is temporarily configured by the terminal device and that are/is indicated in the first assistance information sent by the terminal to the secondary node is 2. In other words, when the maximum quantity of uplink MIMO layers and the maximum quantity of downlink MIMO layers that are configured by the secondary node for the terminal device are less than or equal to 2, the overheating problem of the terminal device can be resolved. The secondary node may configure, for the terminal device with reference to the first assistance information, the maximum quantity of uplink MIMO layers and the maximum quantity of downlink MIMO layers that are greater than or equal to or less than 2. This is not limited in this application.

Alternatively, when the power consumption of the terminal device is excessively high, the first assistance information sent by the terminal device to the secondary node may be the power consumption assistance information used to reduce the power consumption. The power consumption assistance information may include a configuration parameter expected by the terminal device, and the configuration parameter is a configuration parameter used to reduce the power consumption of the terminal device. It should be understood that, when the terminal device establishes a connection to the master node and the secondary node, the master node and the secondary node may obtain a radio communication capability (radio capability) of the terminal device, and a configuration parameter reported by the terminal device when the terminal device needs to reduce the power consumption is less than a configuration parameter corresponding to the radio communication capability, or a configuration parameter reported by the terminal device when the terminal device needs to reduce the power consumption is less than a current configuration parameter of the network device.

Specifically, the terminal device reports, to the secondary node by using the first assistance information, a parameter required for reducing the power consumption of the terminal device, and the secondary node may obtain the parameter.

408: The secondary node configures a parameter for the terminal device based on the first assistance information.

By using the foregoing steps, the secondary node obtains the configuration parameter expected by the terminal device, and the secondary node may configure the communication parameter for the terminal device, to resolve or alleviate the overheating problem of the terminal device or reduce the power consumption of the terminal device.

In a possible implementation, the first assistance information received by the secondary node from the terminal device includes only assistance information for adjusting a configuration of the secondary node. In other words, after receiving the first assistance information, the secondary node may determine to adjust the configuration of the secondary node, and does not need to perform any configuration negotiation with the master node.

Specifically, the implementation process may include the following plurality of cases:

(1) The secondary node receives the first assistance information from the terminal device, where the first assistance information does not include any one of a maximum quantity of uplink secondary cells, a maximum quantity of downlink secondary cells, a maximum quantity of uplink secondary component carriers, a maximum quantity of downlink secondary component carriers, a maximum uplink aggregated bandwidth, and a maximum downlink aggregated bandwidth that are expected by the terminal device. The maximum uplink aggregated bandwidth may include either or both of a maximum uplink aggregated bandwidth of a low frequency FR1 and a maximum uplink aggregated bandwidth of a high frequency FR2, and the maximum downlink aggregated bandwidth may include either or both of a maximum downlink aggregated bandwidth of the low frequency FR1 and a maximum downlink aggregated bandwidth of the high frequency FR2.

It should be understood that the first assistance information may not include any one of the foregoing information. When the terminal device reports the overheating assistance information to the master node after the overheating problem occurs on the terminal device, the secondary node may still obtain the configuration parameter expected by the terminal device in the overheating assistance information sent to the master node.

Alternatively, when the terminal device needs to reduce the power consumption and report the power consumption assistance information, the secondary node may still obtain, through the master node, the configuration parameter expected by the terminal device in the power consumption assistance information.

(2) If the first assistance information received by the secondary node from the terminal device includes any one of a maximum quantity of uplink secondary cells, a maximum quantity of downlink secondary cells, a maximum quantity of uplink secondary component carriers, a maximum quantity of downlink secondary component carriers, a maximum uplink aggregated bandwidth, and a maximum downlink aggregated bandwidth that are expected by the terminal device, the secondary node may automatically ignore the information.

It should be understood that the first assistance information may include any one of the foregoing information. When the terminal device reports the overheating assistance information to the master node after the overheating problem occurs on the terminal device, the secondary node may still obtain the configuration parameter expected by the terminal device in the overheating assistance information sent to the master node, and ignore, based on the configuration parameter expected by the terminal device in the overheating assistance information sent to the master node, the configuration parameter requested by the terminal device in the first assistance information.

Alternatively, when the terminal device needs to reduce the power consumption and report the power consumption assistance information, the secondary node may still obtain, through the master node, the configuration parameter expected by the terminal device in the power consumption assistance information, and ignore, based on the configuration parameter expected by the terminal device in the power consumption assistance information sent to the master node, the configuration parameter requested by the terminal device in the first assistance information.

(3) If the first assistance information received by the secondary node from the terminal device includes any one of a maximum quantity of uplink secondary cells, a maximum quantity of downlink secondary cells, a maximum quantity of uplink secondary component carriers, a maximum quantity of downlink secondary component carriers, a maximum uplink aggregated bandwidth, and a maximum downlink aggregated bandwidth that are expected by the terminal device, the secondary node may consider that the information is applied only to the secondary node side, and is not applied to both the master node side and the secondary node side.

Specifically, the maximum quantity of uplink secondary cells is a maximum quantity of uplink secondary cells on the secondary node side, the maximum quantity of downlink secondary cells is a maximum quantity of downlink secondary cells on the secondary node side, the maximum quantity of uplink secondary component carriers is a maximum quantity of uplink secondary component carriers on the secondary node side, the maximum quantity of downlink secondary component carriers is a maximum quantity of downlink secondary component carriers on the secondary node side, the maximum uplink aggregated bandwidth is a maximum uplink aggregated bandwidth on the secondary node side, and the maximum downlink aggregated bandwidth is a maximum downlink aggregated bandwidth on the secondary node side.

It should be understood that the first assistance information may include any one of the foregoing information. When the terminal device reports the overheating assistance information after the overheating problem occurs on the terminal device, the secondary node may coordinate with the master node still based on the configuration parameter currently expected by the terminal device in the first assistance information, instead of the configuration parameter requested by the terminal device in the first assistance information.

Alternatively, when the terminal device needs to reduce the power consumption and report the power consumption assistance information, the secondary node may coordinate with the master node still based on the configuration parameter currently expected by the terminal device in the first assistance information, instead of the configuration parameter requested by the terminal device in the first assistance information.

Specifically, when the assistance information received by the NR secondary node does not include only the first assistance information for adjusting the configuration of the NR secondary node, in other words, after receiving the first assistance information, the NR secondary node may further receive other assistance information used to adjust the configuration parameter. In this case, the NR secondary node further needs to perform configuration negotiation with the LTE master node. Therefore, the NR secondary node may initiate configuration coordination between the master node and the secondary node. This is not limited in this application.

It should be understood that the foregoing describes a process in which the terminal device reports assistance information related to the secondary node to the secondary node. The process may include some or all of step 401 to step 408, and a sequence of performing step 401 to step 408 or content included in step 401 to step 408 is not limited in this application.

It should be further understood that the method 400 is mainly described by using an example in which the terminal device reports the first assistance information to the secondary node. In this implementation process, behavior of the master node is not limited. For example, the terminal device may further report capability information to the master node to notify the master node that the terminal device has a capability of reporting the second assistance information to the master node. The master node may also send, to the terminal device, configuration information indicating that the terminal device can report the second assistance information. When the terminal device needs to resolve the overheating problem or needs to reduce the power consumption, in addition to reporting the first assistance information to the secondary node, the terminal device may further report the second assistance information to the master node. This is not limited in this application.

In conclusion, according to the information transmission method provided in this embodiment of this application, the terminal device reports the overheating assistance information to the secondary node, and the secondary node configures a new communication parameter for the terminal device based on the overheating assistance information, to effectively resolve the overheating problem of the terminal device. Alternatively, the terminal device reports the power consumption assistance information to the secondary node, and the secondary node configures a new communication parameter for the terminal device based on the power consumption assistance information, to reduce the power consumption of the terminal device.

Figure 5:
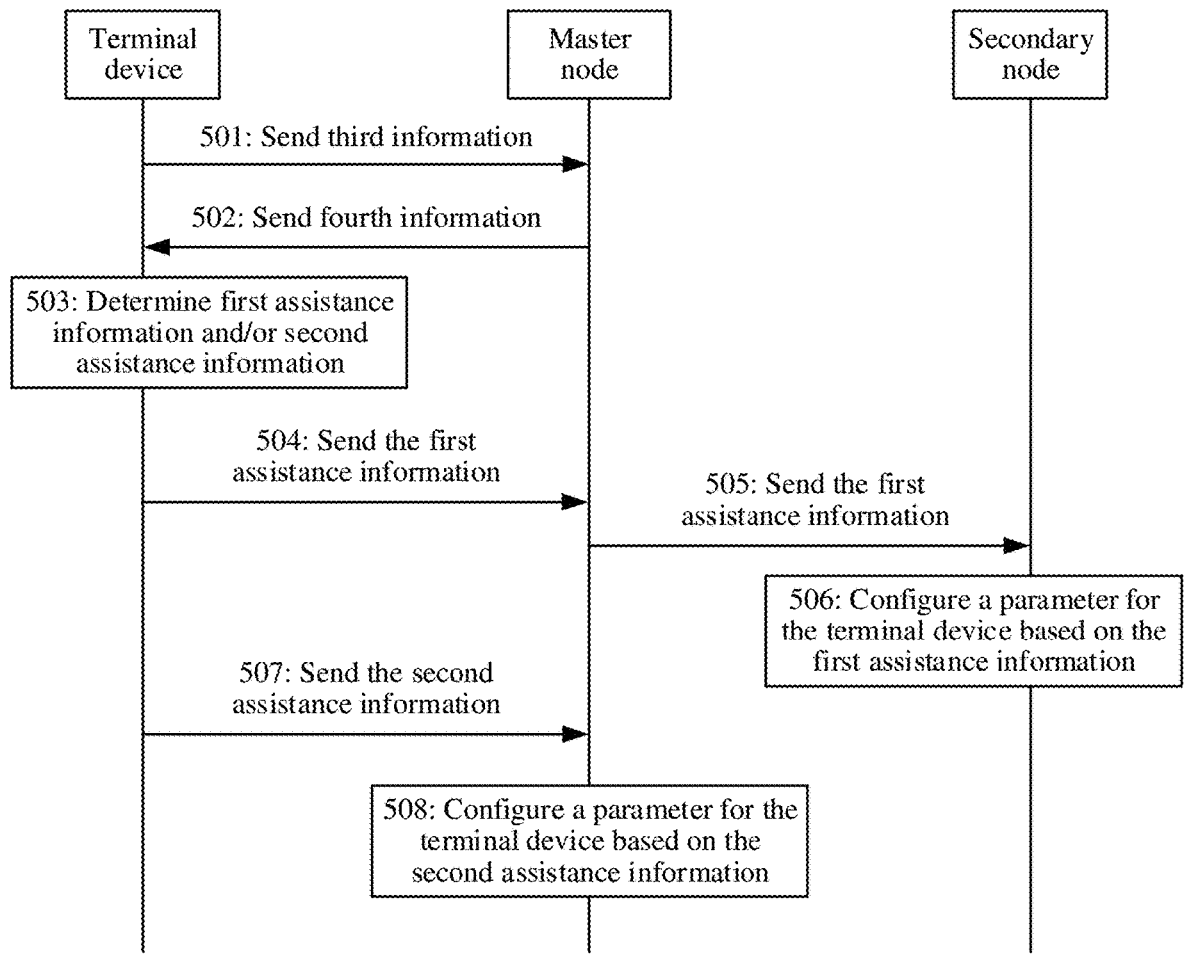
FIG. 5 is a schematic interaction diagram of another information transmission method according to an embodiment of this application.

FIG. 5 is a schematic interaction diagram of another information transmission method 500 according to an embodiment of this application. The following describes steps of the method 500 in detail.

It should be understood that, in this embodiment of this application, the method 500 is described by using an example in which a terminal device and network devices (for example, a master node and a secondary node) perform the method 500. Byway of example and not limitation, the method 500 may alternatively be performed by a chip used in the terminal device and chips used in the master node and the secondary node.

It should be further understood that the information transmission method provided in this embodiment of this application is not limited to any network connection architecture, for example, is not limited to any possible network connection form enumerated in FIG. 2(a) to FIG. 2(d). This is not limited in this application.

501: The terminal device sends third information to the master node. Correspondingly, the master node receives the third information sent by the terminal device.

It should be understood that, before reporting first assistance information and/or the second assistance information, the terminal device may first report information used to indicate whether the terminal device supports reporting of the assistance information, where the information is referred to as "third information" herein. The third information may be understood as capability information reported by the terminal device. In a process in which the terminal device sends the third information to the master node, the third information may be carried in a terminal device capability information (UE capability information) message, and terminal device capability information indicates a radio access capability of the terminal device.

In a possible implementation, the third information is used to indicate whether the terminal device supports reporting of the first assistance information and/or the second assistance information.

It should be understood that the third information herein may be used to indicate a capability of the terminal device to report the first assistance information and/or the second assistance information to the master node, and may be further used to indicate a capability of the terminal device to report the first assistance information and/or the second assistance information to the secondary node. The terminal device does not need to separately report the capability information to the master node and the secondary node. In other words, the terminal device sends the third information to the master node, and the master node may further send the third information to the secondary node. Therefore, both the master node and the secondary node may determine, based on the third information, whether the terminal device has the capability of reporting the first assistance information and/or the second assistance information.

It should be understood that, that the terminal device has the capability of sending the second assistance information and the first assistance information does not mean that the terminal device needs to simultaneously send the second assistance information and the first assistance information each time. When the terminal device needs to send the assistance information, the terminal device may send either or both of the second assistance information and the first assistance information.

Optionally, the third information may be carried in an EUTRA capability (UE-EUTRA-capability) in the terminal device capability information message, in other words, carried in an EUTRA capability container (container). Specifically, an indication message indicating whether the terminal device supports reporting of the assistance information is included in the EUTRA capability container container. The terminal device sends the EUTRA capability container container to the master node, and the master node may obtain the third information to determine whether the terminal device supports reporting of the assistance information.

Specifically, the third information is used to indicate whether the terminal device supports reporting of the first assistance information and the second assistance information. In other words, whether the terminal device supports reporting of the first assistance information and the second assistance information is a capability of the terminal device: a capability that the terminal device supports reporting of both the first assistance information and the second assistance information, or a capability that the terminal device does not support reporting of the first assistance information and the second assistance information, namely, a capability that one piece of capability information controls both reporting of the second assistance information on a master node side and reporting of the first assistance information on a secondary node side.

Optionally, the first information and the third information may be a same type of information or different types of information.

Optionally, when the first information and the third information are different types of information, the first information and the third information may be carried on a same message carrier (for example, carried in the terminal device capability information message), or carried on different message carriers.

Specifically, for step 501, refer to the related descriptions of step 401 in FIG. 4. For brevity, details are not described herein again.

502: The master node sends the fourth information to the terminal device. Correspondingly, the terminal device receives the fourth information sent by the master node.

Optionally, the fourth information is used to indicate that the terminal device can report the first assistance information and/or the second assistance information. The master node may determine, based on the capability information (the third information) reported by the terminal device, that the terminal device supports reporting of the first assistance information and/or the second assistance information, and send the fourth information to the terminal device to indicate that the terminal device is allowed to report the first assistance information and/or the second assistance information.

Specifically, when the fourth information is used to indicate that the terminal device can report the first assistance information and the second assistance information, it indicates that the terminal device can send the second assistance information on the master node side and the terminal device can send the first assistance information on the secondary node side, in other words, both reporting of the second assistance information on the master node side and reporting of the first assistance information on the secondary node side are configured by using the fourth information. It should be understood that, that the terminal device may send the second assistance information and the first assistance information does not mean that the terminal device needs to simultaneously send the second assistance information and the first assistance information each time. When the terminal device needs to send the assistance information, the terminal device may send either or both of the second assistance information and the first assistance information.

Optionally, the fourth information is further used to indicate to configure a value of a timer for the terminal device. Specifically, the timer may be a prohibit timer. The terminal device determines a running period and a non-running period of the prohibit timer based on the value of the timer in the fourth information. Therefore, the terminal device may send the first assistance information within the non-running period of the prohibit timer, and may not send the first assistance information within the running period of the prohibit timer. This is not limited in this application.

Specifically, when the fourth information is used to indicate that the terminal device can report the first assistance information and the second assistance information, the timer is a timer used on the master node side and the secondary node side for controlling sending of the second assistance information on the master node side and sending of the first assistance information on the secondary node side. In other words, both reporting of the second assistance information on the master node side and reporting of the first assistance information on the secondary node side are controlled by the timer.

Optionally, the fourth information and the second information may be a same type of information or different types of information.

Optionally, when the fourth information and the second information are different types of information, the fourth information and the second information may be carried on a same message carrier, or carried on different message carriers.

Optionally, the fourth information may be carried in an RRC connection reconfiguration message.

503: The terminal device determines the first assistance information and/or the second assistance information.

It should be understood that, in this embodiment of this application, assistance information reported by the terminal device to the secondary node is referred to as "first assistance information", and assistance information reported by the terminal device to the master node is referred to as "second assistance information". In other words, the first assistance information is used to indicate a configuration parameter requested by the terminal device from the secondary node, and the second assistance information is used to indicate a configuration parameter requested by the terminal device from the master node.

504: The terminal device sends the first assistance information to the master node. Correspondingly, the master node receives the first assistance information sent by the terminal device.

505: The master node sends the first assistance information to the secondary node. Correspondingly, the secondary node receives the first assistance information sent by the master node.

In a possible implementation, the first assistance information is power consumption assistance information, and the power consumption assistance information is used to indicate to reduce power consumption of the terminal device; or the first assistance information is overheating assistance information, and the overheating assistance information is used to indicate to resolve an overheating problem of the terminal device.

It should be understood that the first assistance information includes information used to indicate the configuration parameter requested by the terminal device from the secondary node. In addition, the first assistance information may further include more other information and perform other functions. Specifically, for related descriptions of the first assistance information, refer to the descriptions in the method 400. For brevity, details are not described herein again.

507: The terminal device sends the second assistance information to the master node. Correspondingly, the master node receives the second assistance information sent by the terminal device.

It should be understood that, in this application, the second assistance information includes information used to indicate the configuration parameter requested by the terminal device from the master node; or the second assistance information is used to indicate a configuration parameter expected by the terminal device, and the terminal device requests the master node to perform configuration based on the configuration parameter expected by the terminal device. In addition, the second assistance information may further include more other information and perform other functions. This is not limited in this application.

In a possible implementation, the second assistance information is power consumption assistance information, and the power consumption assistance information is used to indicate to reduce the power consumption of the terminal device; or the second assistance information is overheating assistance information, and the overheating assistance information is used to indicate to resolve the overheating problem of the terminal device.

Specifically, the foregoing descriptions are provided: The information transmission method provided in this application may be applied to a scenario in which an overheating problem occurs on the terminal device or a scenario in which the terminal device needs to reduce power consumption. In other words, the information transmission method 500 described in FIG. 5 may be used to resolve the overheating problem of the terminal device or reduce the power consumption of the terminal device. This is not limited in this application.

Optionally, the second assistance information may include at least one of the following parameter information: a maximum quantity of uplink secondary cells, a maximum quantity of downlink secondary cells, a maximum quantity of uplink multiple-input multiple-output radio antenna layers MIMO layers, a maximum quantity of downlink MIMO layers, a maximum uplink aggregated bandwidth, a maximum downlink aggregated bandwidth, a processing latency of the terminal device, an antenna domain configuration parameter of the terminal device, a discontinuous reception DRX configuration parameter of the terminal device, a physical downlink control channel PDCCH monitoring parameter of the terminal device, a search space configuration parameter of the terminal device, a maximum quantity of blind detection times of the terminal device, activation information of a secondary cell or a secondary cell group of the terminal device, a measurement-related parameter of the terminal device, and the RRC connection release request parameter.

It should be understood that the foregoing enumerated information is all possible information types, and this application includes but is not limited to this.

506: The secondary node configures a parameter for the terminal device based on the first assistance information.

In a possible implementation, when the secondary node obtains the configuration parameter expected by the terminal device, the secondary node may configure a communication parameter for the terminal device, to resolve or alleviate the overheating problem of the terminal device or reduce the power consumption of the terminal device.

508: The master node configures a parameter for the terminal device based on the second assistance information.

In a possible implementation, when the master node obtains, by using the second assistance information, the configuration parameter expected by the terminal device, the master node may configure a communication parameter for the terminal device, to resolve or alleviate the overheating problem of the terminal device or reduce the power consumption of the terminal device.

It should be understood that the foregoing describes a process in which the terminal device reports assistance information related to the secondary node to the secondary node and a process in which the terminal device reports assistance information related to the master node to the master node. The processes may include some or all of step 501 to step 510, and a sequence of performing step 501 to step 510 or content included in step 501 to step 510 is not limited in this application.

In another possible implementation, the terminal device may not only report the first assistance information to the secondary node, but also report the second assistance information to the master node. This implementation may include step 503 to step 508.

Optionally, in this implementation, the master node may configure the parameter based on the second assistance information reported by the terminal device, and the secondary node may configure the parameter based on the first assistance information reported by the terminal device. In other words, the master node and the secondary node receive respective assistance information and coordinate respective configuration parameters.

For example, when the overheating problem occurs on the terminal device, the terminal device reports assistance information used to resolve the overheating problem of the terminal device. If the terminal device reports terminal device assistance information of the master node, the terminal device assistance information may include a configuration parameter of the master node that is expected by the terminal device. If the terminal device reports terminal device assistance information of the secondary node, the terminal device assistance information may include a configuration parameter of the secondary node that is expected by the terminal device.

For example, when the power consumption of the terminal device is relatively high, the terminal device reports terminal device assistance information used to reduce the power consumption. If the terminal device reports terminal device assistance information of the master node, the terminal device assistance information may include a configuration parameter of the master node that is expected by the terminal device. If the terminal device reports terminal device assistance information of the secondary node, the terminal device assistance information may include a configuration parameter of the secondary node that is expected by the terminal device.

Optionally, the first assistance information and the second assistance information may be carried in a same message or different messages. For example, the second assistance information sent by the terminal device to the master node may be carried in terminal device assistance information (UE assistance information), and the first assistance information sent by the terminal device to the master node may be carried in an uplink information transfer MRDC (UL Information Transfer MRDC) message.

Optionally, after receiving the first assistance information and the second assistance information, the master node sends the first assistance information to the secondary node. Alternatively, the master node may obtain the first assistance information from only a message carrying the first assistance information and the second assistance information, and forward the first assistance information to the secondary node without processing the message, and the secondary node obtains the first assistance information. Alternatively, after obtaining the first assistance information from a message carrying the first assistance information and the second assistance information, the master node may process the first assistance information, and then send the first assistance information to the secondary node through another message carrier. This is not limited in this application.

In another possible implementation, when the terminal device reports the first assistance information to the secondary node and reports the second assistance information to the master node, the master node may coordinate configuration parameters of the master node and the secondary node.

Specifically, the terminal device reports terminal device assistance information, where the terminal device assistance information indicates terminal device assistance information that is applied to both the master node and the secondary node, and the terminal device assistance information may include configuration parameters of the master node and the secondary node that are expected by the terminal device. In this case, the master node needs to coordinate the configuration parameters of the master node and the secondary node.

For example, when the overheating problem occurs on the terminal device, the terminal device reports assistance information used to resolve the overheating problem of the terminal device. If the terminal device reports the terminal device assistance information of the master node and the terminal device assistance information of the secondary node, the master node may coordinate the configuration parameters of the master node and the secondary node based on the configuration parameter expected by the terminal device.

For example, when the power consumption of the terminal device is relatively high, the terminal device reports terminal device assistance information used to reduce the power consumption. If the terminal device reports the terminal device assistance information of the master node and the terminal device assistance information of the secondary node, the master node may coordinate the configuration parameters of the master node and the secondary node based on the configuration parameter expected by the terminal device.

The foregoing describes the another information transmission method provided in this embodiment of this application. The terminal device reports the first assistance information to the secondary node and/or reports the second assistance information to the master node. In a process in which the master node and the secondary node configure parameters for the terminal device, the master node and the secondary node may configure the parameters for the terminal device based on respective assistance information without coordination, or the master node coordinates configurations of the master node and the secondary node based on the assistance information reported by the terminal device, to configure the parameter for the terminal device. When the method is applied to a case in which the overheating problem occurs on the terminal device, the base station may configure a new communication parameter for the terminal device based on the overheating assistance information, to effectively resolve the overheating problem of the terminal device. Alternatively, when the method is applied to a case in which the power consumption of the terminal device is relatively high and the power consumption of the terminal device needs to be reduced, the power consumption assistance information is reported, and the base station may configure a new communication parameter for the terminal device based on the power consumption assistance information, to reduce the power consumption of the terminal device.

The foregoing describes in detail the information transmission methods in the embodiments of this application with reference to FIG. 1 to FIG. 5. The following describes in detail information transmission apparatuses in the embodiments of this application with reference to FIG. 6 to FIG. 10.

Figure 6:
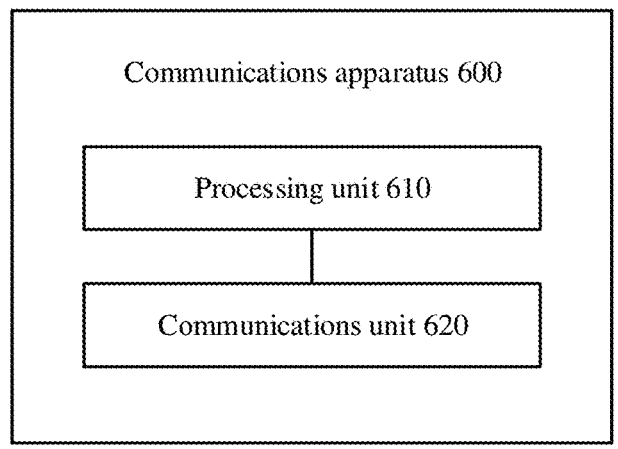
FIG. 6 is a schematic block diagram of a communications apparatus according to an embodiment of this application.

FIG. 6 is a schematic block diagram of a communications apparatus 600 according to an embodiment of this application. The apparatus 600 may correspond to the terminal device described in the method 400 or the method 500, or may be a chip or a component applied to the terminal device. In addition, modules or units in the apparatus 600 are respectively configured to perform the actions or processing processes performed by the terminal device in the method 400 or the method 500. As shown in FIG. 6, the communications apparatus 600 may include a processing unit 610 and a communications unit 620.

The processing unit 610 is configured to determine first assistance information, where the first assistance information is used to indicate a configuration parameter requested from a first network device.

The communications unit 620 is configured to send the first assistance information to a second network device.

The communications unit 620 is further configured to send first information to the second network device, where the first information is used to indicate whether the apparatus supports reporting of the first assistance information.

In some possible implementations, when the first information is used to indicate that the apparatus supports reporting of the first assistance information, the communications unit 620 is further configured to receive second information sent by the second network device, or the communications unit is further configured to receive the second information sent by the first network device, where the second information is used to indicate that the apparatus can report the first assistance information.

In some possible implementations, the second information is further used to indicate to configure a value of a timer.

Specifically, the timer may be a prohibit timer. The terminal device determines a running period and a non-running period of the prohibit timer based on the value of the timer in the second information. Therefore, the terminal device may send the first assistance information within the non-running period of the prohibit timer, and may not send the first assistance information within the running period of the prohibit timer. This is not limited in this application.

In some possible implementations, the processing unit 610 is further configured to determine second assistance information, where the second assistance information is used to indicate a configuration parameter requested by the apparatus from the second network device; and the communications unit is further configured to send the second assistance information to the second network device.

In some possible implementations, the communications unit 620 is further configured to send third information to the second network device, where the third information is used to indicate whether the apparatus supports reporting of the first assistance information and/or the second assistance information.

In some possible implementations, when the third information is used to indicate that the apparatus supports reporting of the first assistance information and/or the second assistance information, the communications unit 620 is further configured to receive fourth information sent by the second network device, where the fourth information is used to indicate that the apparatus can report the first assistance information and/or the second assistance information.

Specifically, the processing unit 610 is configured to perform step 405 in the method 400, and the communications unit 620 is configured to perform step 401, step 404, and step 406 in the method 400; or the processing unit 610 is configured to perform step 503 in the method 500, and the communications unit 620 is configured to perform step 501, step 502, step 504, and step 507 in the method 500. Specific processes in which the units perform the foregoing corresponding steps are described in detail in the method 400 and the method 500. For brevity, details are not described herein again.

Figure 7:
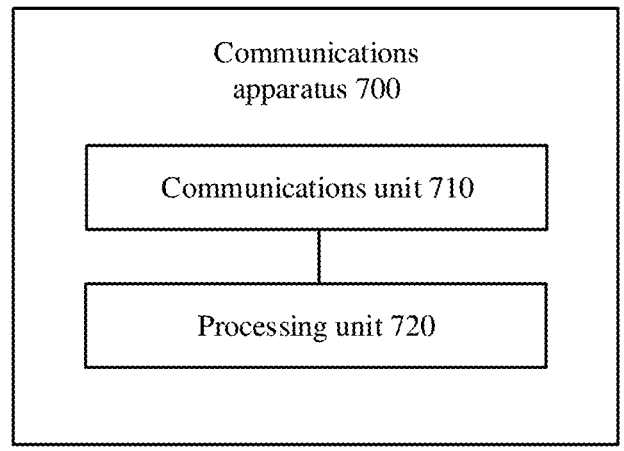
FIG. 7 is a schematic block diagram of another communications apparatus according to an embodiment of this application.

FIG. 7 is a schematic block diagram of a communications apparatus 700 according to an embodiment of this application. The apparatus 700 may correspond to the master node described in the method 400 or the method 500, or may be a chip or a component applied to the master node. In addition, modules or units in the apparatus 700 are respectively configured to perform the actions or processing processes performed by the master node in the method 400 or the method 500. As shown in FIG. 7, the communications apparatus 700 may include a communications unit 710 and a processing unit 720.

The communications unit 710 is configured to receive first assistance information sent by a terminal device, where the first assistance information is used to indicate a configuration parameter requested by the terminal device from a first network device.

The communications unit 710 is further configured to send the first assistance information to the first network device.

In some possible implementations, before receiving the first assistance information sent by the terminal device, the communications unit 710 is further configured to: receive first information sent by the terminal device, where the first information is used to indicate whether the terminal device supports reporting of the first assistance information; and send the first information to the first network device.

In some possible implementations, when the first information is used to indicate that the terminal device supports reporting of the first assistance information, the communications unit 710 is further configured to: receive the second information sent by the first network device, where the second information is used to indicate that the terminal device can report the first assistance information; and send the second information to the terminal device.

In some possible implementations, the communications unit 710 is further configured to receive second assistance information sent by the terminal device, where the second assistance information is used to indicate a configuration parameter requested by the terminal device from a second network device; and the processing unit 720 is configured to configure a parameter for the terminal device based on the second assistance information.

In some possible implementations, the communications unit 710 is further configured to receive third information sent by the terminal device, where the third information is used to indicate whether the terminal device supports reporting of the first assistance information and/or the second assistance information.

In some possible implementations, when the third information is used to indicate that the terminal device supports reporting of the first assistance information and/or the second assistance information, the communications unit 710 is further configured to receive fourth information sent by the terminal device, where the fourth information is used to indicate that the terminal device can report the second assistance information.

Specifically, the communications unit 710 is configured to perform step 401, step 402, step 403, step 404, step 406, and step 407 in the method 400, or the communications unit 710 is configured to perform step 501, step 502, step 504, step 505, and step 507 in the method 500; and the processing unit 720 is configured to perform step 508 in the method 500. Specific processes in which the units perform the foregoing corresponding steps are described in detail in the method 400 and the method 500. For brevity, details are not described herein again.

Figure 8:
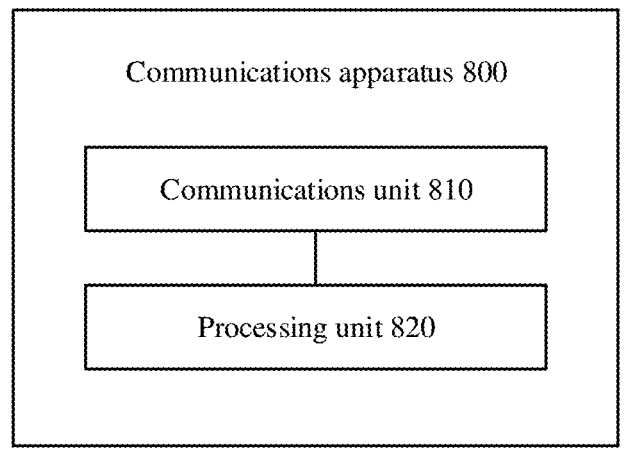
FIG. 8 is a schematic block diagram of still another communications apparatus according to an embodiment of this application.

FIG. 8 is a schematic block diagram of a communications apparatus 800 according to an embodiment of this application. The apparatus 800 may correspond to the secondary node described in the method 400 or the method 500, or may be a chip or a component applied to the secondary node. In addition, modules or units in the apparatus 800 are respectively configured to perform actions or processing processes performed by the master node in the method 400 or the method 500. As shown in FIG. 8, the communications apparatus 800 may include a communications unit 810 and a processing unit 820.

The communications unit 810 is configured to receive first assistance information sent by a second network device, where the first assistance information is used to indicate a configuration parameter requested by the terminal device from the apparatus.

The processing unit 820 is configured to configure a parameter for the terminal device based on the first assistance information.

In some possible implementations, before the communications unit 810 receives the first assistance information sent by the second network device, the communications unit 810 is further configured to receive first information sent by the second network device, where the first information is used to indicate whether the terminal device supports reporting of the first assistance information.

In some possible implementations, when the first network device determines that the terminal device supports reporting of the first assistance information, the communications unit 810 is further configured to send second information to the second network device, or send the second information to the terminal device, where the second information is used to indicate that the terminal device can report the first assistance information.

Specifically, the communications unit 810 is configured to perform step 402, step 403, and step 407 in the method 400, and the processing unit 820 is configured to perform step 408 in the method 400; or the communications unit 810 is configured to perform step 505 in the method 500, and the processing unit 820 is configured to perform step 506 in the method 500. Specific processes in which the units perform the foregoing corresponding steps are described in detail in the method 400 and the method 500. For brevity, details are not described herein again.

Figure 9:
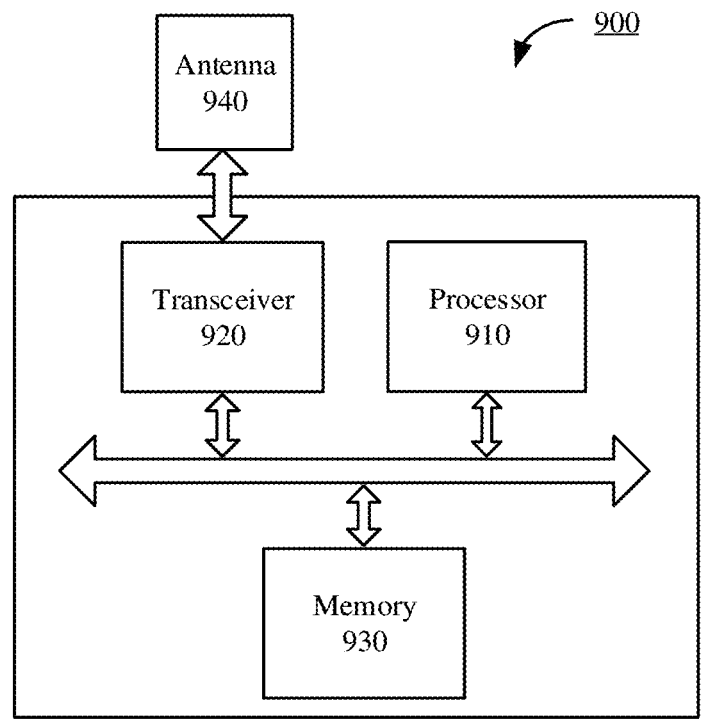
FIG. 9 is a schematic structural diagram of an apparatus according to an embodiment of this application.

FIG. 9 is a schematic structural diagram of an apparatus 900 according to an embodiment of this application. As shown in FIG. 9, the apparatus 900 includes a processor 910 and a transceiver 920. Optionally, the apparatus 900 further includes a memory 930. The processor 910, the transceiver 920, and the memory 930 communicate with each other through an internal connection path, to transfer a control signal and/or a data signal. The memory 930 is configured to store a computer program. The processor 910 is configured to invoke the computer program from the memory 930 and run the computer program, to control the transceiver 920 to send or receive a signal.

The processor 910 is configured to execute program code stored in the memory 930, to implement the functions of the terminal device in the foregoing method embodiments. During specific implementation, the memory 930 may alternatively be integrated into the processor 910, or may be independent of the processor 910. The transceiver 920 may be implemented by using a transceiver circuit.

The apparatus 900 may further include an antenna 940, configured to send, by using a radio signal, uplink data or uplink control signaling that is output by the transceiver 920, or send, after receiving downlink data or downlink control signaling, the downlink data or the downlink control signaling to the transceiver 920 for further processing.

It should be understood that the apparatus 900 may correspond to the terminal device in the method 400 or the method 500 according to the embodiments of this application, or the apparatus 900 may be a chip or a component applied to the terminal device. In addition, the modules in the apparatus 900 implement corresponding procedures in the method 400 or the method 500. Specifically, the memory 930 is configured to store program code, so that when the processor 910 executes the program code, the processor 910 is controlled to perform step 405 in the method 400 or perform step 503 in the method 500, and the transceiver 920 is configured to perform step 401, step 404, and step 406 in the method 400 or perform step 501, step 502, step 504, and step 507 in the method 500. Specific processes in which the units perform the foregoing corresponding steps are described in detail in the method 400 and the method 500. For brevity, details are not described herein again.

Figure 10:
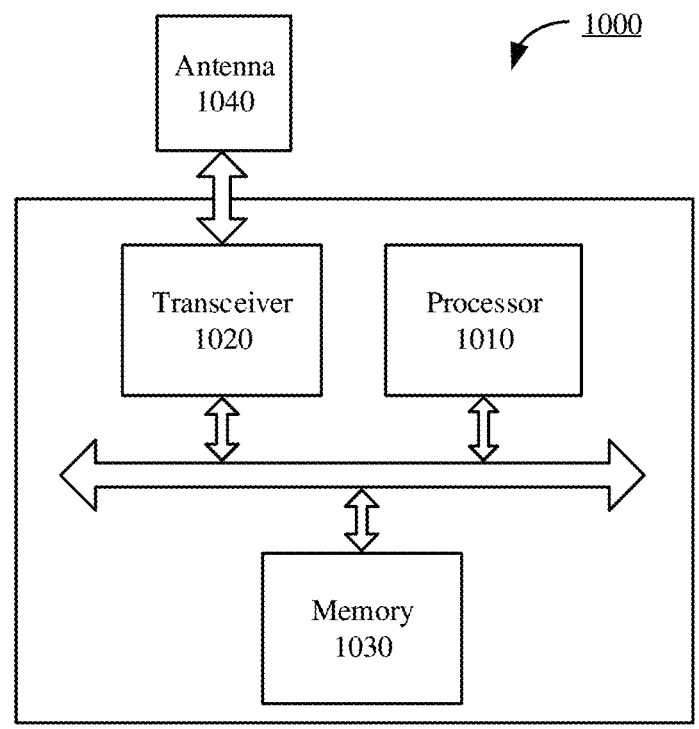
FIG. 10 is a schematic structural diagram of another apparatus according to an embodiment of this application.

FIG. 10 is a schematic structural diagram of a network device 1000 according to an embodiment of this application. As shown in FIG. 10, the network device 1000 (for example, a base station, a CU, or a DU) includes a processor 1010 and a transceiver 1020. Optionally, the network device 1000 further includes a memory 1030. The processor 1010, the transceiver 1020, and the memory 1030 communicate with each other through an internal connection path, to transfer a control signal and/or a data signal. The memory 1030 is configured to store a computer program. The processor 1010 is configured to invoke the computer program from the memory 1030 and run the computer program, to control the transceiver 1020 to send or receive a signal.

The processor 1010 and the memory 1030 may be integrated into one processing apparatus. The processor 1010 is configured to execute program code stored in the memory 1030, to implement the functions of the base station, the CU, or the DU in the foregoing method embodiments. During specific implementation, the memory 1030 may alternatively be integrated into the processor 1010, or may be independent of the processor 1010. The transceiver 1020 may be implemented by using a transceiver circuit.

The network device may further include an antenna 1040, configured to send, by using a radio signal, downlink data or downlink control signaling that is output by the transceiver 1020, or send, after receiving uplink data or uplink control signaling, the uplink data or the uplink control signaling to the transceiver 820 for further processing.

It should be understood that the apparatus 1000 may correspond to the master node or the secondary node in the method 400 or the method 500 according to the embodiments of this application, or the apparatus 1000 may be a chip or a component applied to the eNodeB. In addition, the modules in the apparatus 1000 implement corresponding procedures in the method 400 in FIG. 4 or the method 500 in FIG. 5. Specific processes in which the units perform the foregoing corresponding steps are described in detail in the method 400 and the method 500. For brevity, details are not described herein again.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined. In addition, the displayed or discussed mutual couplings or communication connections may be indirect couplings or communication connections through some interfaces, apparatuses, or units.

In addition, function units in the embodiments of this application may be integrated into one physical entity, or each of the units may be separately corresponding to one physical entity, or two or more units may be integrated into one physical entity.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A method, applied in a terminal device, the method comprising:
   determining first assistance information, wherein the first assistance information indicates a configuration parameter requested by the terminal device from a first network device, and the first assistance information comprises power consumption assistance information which indicates to reduce power consumption of the terminal device; and
   sending the first assistance information to a second network device, wherein the first assistance information is forwarded by the second network device to the first network device, the configuration parameter is based on the first assistance information, and wherein the first network device is a secondary node device in dual connectivity, and the second network device is a master node device in dual connectivity; and
   wherein the first assistance information further comprises at least one of the following parameter information:
      a processing latency of the terminal device, an antenna domain configuration parameter of the terminal device, a discontinuous reception (DRX) configuration parameter of the terminal device, a maximum quantity of blind detection times of the terminal device, a measurement-related parameter of the terminal device, or a radio resource control (RRC) connection release request parameter.

2. The method according to claim 1, wherein before determining the first assistance information, the method comprises:
   sending, by the terminal device, first information to the second network device, wherein the first information indicates whether the terminal device supports reporting of the first assistance information.

3. The method according to claim 2, further comprising:
   receiving second information sent by the second network device, wherein the second information indicates that the terminal device is capable of reporting the first assistance information.

4. The method according to claim 3, further comprising:
   determining second assistance information, wherein the second assistance information indicates a configuration parameter requested by the terminal device from the second network device; and
   sending, by the terminal device, the second assistance information to the second network device.

5. The method according to claim 4, further comprising:
   sending, by the terminal device, third information to the second network device, wherein the third information indicates whether the terminal device supports reporting the second assistance information.

6. The method according to claim 5, further comprising:
   receiving, by the terminal device, fourth information sent by the second network device, wherein the fourth information indicates that the terminal device is capable of reporting the second assistance information.

7. A method, applied in a second network device, the method comprising:
   receiving first assistance information sent from a terminal device, wherein the first assistance information indicates a configuration parameter requested by the terminal device from a first network device, and the first assistance information comprises power consumption assistance information which indicates to reduce power consumption of the terminal device; and
   sending the first assistance information to the first network device, wherein the configuration parameter is based on the first assistance information; and
   wherein the first network device is a secondary node device in dual connectivity, and the second network device is a master node device in dual connectivity; and
   wherein the first assistance information further comprises at least one of the following parameter information:
      a processing latency of the terminal device, an antenna domain configuration parameter of the terminal device, a discontinuous reception (DRX) configuration parameter of the terminal device, a maximum quantity of blind detection times of the terminal device, a measurement-related parameter of the terminal device, or a radio resource control (RRC) connection release request parameter.

8. The method according to claim 7, wherein before receiving the first assistance information sent by the terminal device, the method further comprises:
   receiving, by the second network device, first information sent by the terminal device, wherein the first information indicates whether the terminal device supports reporting of the first assistance information.

9. The method according to claim 8, further comprising:
   sending, by the second network device, the first information to the first network device.

10. The method according to claim 9, further comprising:
    receiving, by the second network device, second information sent by the first network device, wherein the second information indicates that the terminal device is capable of reporting the first assistance information; and
    sending, by the second network device, the second information to the terminal device.

11. A method, applied in a first network device, the method 1 comprising:
    receiving first assistance information sent from a second network device, wherein the first assistance information indicates a configuration parameter requested by a terminal device from the first network device, and wherein the first assistance information is sent by the terminal device to the second network device, and the first assistance information comprises power consumption assistance information which indicates to reduce power consumption of the terminal device; and
    configuring a parameter for the terminal device based on the first assistance information; and
    wherein the first network device is a secondary node device in dual connectivity, and the second network device is a master node device in dual connectivity; and
    wherein the first assistance information further comprises at least one of the following parameter information:
       a processing latency of the terminal device, an antenna domain configuration parameter of the terminal device, a discontinuous reception (DRX) configuration parameter of the terminal device, a maximum quantity of blind detection times of the terminal device, a measurement-related parameter of the terminal device, or a radio resource control (RRC) connection release request parameter.

12. The method according to claim 11, wherein before receiving, by the first network device, the first assistance information sent by the second network device, the method further comprises:

receiving, by the first network device, first information sent by the second network device, wherein the first information indicates whether the terminal device supports reporting of the first assistance information.

13. The method according to claim 12, further comprising:

sending, by the first network device, second information to the second network device, wherein the second information indicates that the terminal device is capable of reporting the first assistance information.

14. The method according to claim 12, wherein:

the power consumption assistance information indicates to reduce power consumption of the terminal device; or the first assistance information is overheating assistance information, and the overheating assistance information indicates to resolve an overheating problem of the terminal device.

* * * * *

UNITED STATES PATENT AND TRADEMARK OFFICE
CERTIFICATE OF CORRECTION

| | | |
|---|---|---|
| PATENT NO. | : 12,114,265 B2 | Page 1 of 1 |
| APPLICATION NO. | : 17/605863 | |
| DATED | : October 8, 2024 | |
| INVENTOR(S) | : Kuang et al. | |

It is certified that error appears in the above-identified patent and that said Letters Patent is hereby corrected as shown below:

In the Claims

In Column 48, in Claim 11, Line 47, after "method" delete "1".

Signed and Sealed this
Twelfth Day of November, 2024

Katherine Kelly Vidal
*Director of the United States Patent and Trademark Office*